(12) United States Patent
Urabe et al.

(10) Patent No.: US 8,724,524 B2
(45) Date of Patent: May 13, 2014

(54) WIRELESS COMMUNICATION APPARATUS AND WIRELESS COMMUNICATION METHOD

(75) Inventors: Yoshio Urabe, Nara (JP); Kenji Miyanaga, Osaka (JP); Kazuhiro Ando, Osaka (JP); Chalermphol Apichaichalermwongse, Osaka (JP); Tsutomu Mukai, Osaka (JP)

(73) Assignee: Panasonic Corporation, Osaka (JP)

( * ) Notice: Subject to any disclaimer, the term of this patent is extended or adjusted under 35 U.S.C. 154(b) by 358 days.

(21) Appl. No.: 13/233,310

(22) Filed: Sep. 15, 2011

(65) Prior Publication Data

US 2012/0020257 A1  Jan. 26, 2012

Related U.S. Application Data

(62) Division of application No. 11/916,884, filed as application No. PCT/JP2006/311550 on Jun. 8, 2006, now Pat. No. 8,040,837.

(30) Foreign Application Priority Data

Oct. 6, 2005 (JP) .................................. 2005-171383
Nov. 11, 2005 (JP) .................................. 2005-327202

(51) Int. Cl.
  *H04B 7/005* (2006.01)

(52) U.S. Cl.
  USPC ............................ 370/278; 370/252; 370/350

(58) Field of Classification Search
  USPC ......... 370/252, 276, 277, 278, 328, 338, 350, 370/401, 410, 400
  See application file for complete search history.

(56) References Cited

U.S. PATENT DOCUMENTS

| | | | |
|---|---|---|---|
| 6,414,955 B1 * | 7/2002 | Clare et al. | 370/390 |
| 6,473,624 B1 | 10/2002 | Corbett et al. | |
| 6,653,977 B1 | 11/2003 | Okabe et al. | |
| 6,819,259 B2 | 11/2004 | Yamaguchi | |
| 7,006,451 B2 | 2/2006 | Kuwahara | |

(Continued)

FOREIGN PATENT DOCUMENTS

| | | |
|---|---|---|
| EP | 1 128 579 | 8/2001 |
| JP | 11-205322 | 7/1999 |

(Continued)

OTHER PUBLICATIONS

International Search Report issued Aug. 29, 2006 in the International (PCT) Application PCT/2006/311550.

(Continued)

*Primary Examiner* — Ricky Ngo
*Assistant Examiner* — Christine Ng
(74) *Attorney, Agent, or Firm* — Wenderoth, Lind & Ponack, L.L.P.

(57) ABSTRACT

When communicating with a second wireless station, a first wireless station judges, based on link-related information received from the second wireless station and link-related information extracted from a signal transmitted by a fourth wireless station, whether a transmission link from the third wireless station to the fourth wireless station and a transmission link from the first wireless station to the second wireless station can be concurrently established without interference with each other. If judging affirmatively, the first wireless station transmits a signal to the second wireless station in synchronization with a signal transmitted by the third wireless station to the fourth wireless station.

12 Claims, 18 Drawing Sheets

(56) References Cited

U.S. PATENT DOCUMENTS

| | | |
|---|---|---|
| 7,016,396 B2 | 3/2006 | Agrawal et al. |
| 7,016,697 B2 | 3/2006 | Ngai et al. |
| 7,039,038 B2 | 5/2006 | Shoemake |
| 7,050,452 B2 | 5/2006 | Sugar et al. |
| 7,072,634 B2 * | 7/2006 | Tillotson ............... 455/296 |
| 7,136,929 B2 | 11/2006 | Koprivica |
| 7,154,448 B2 | 12/2006 | Lee |
| 7,190,967 B2 | 3/2007 | Kawai et al. |
| 7,239,615 B2 | 7/2007 | Nevo et al. |
| 7,342,876 B2 * | 3/2008 | Bellur et al. ............ 370/221 |
| 7,433,965 B2 | 10/2008 | Kawai et al. |
| 7,440,730 B2 * | 10/2008 | Aloni-Lavi et al. ....... 455/63.1 |
| 8,355,748 B2 * | 1/2013 | Abe et al. ............... 455/552.1 |
| 2001/0039183 A1 | 11/2001 | Kobayashi et al. |
| 2002/0031100 A1 | 3/2002 | Sashihara |
| 2002/0041584 A1 | 4/2002 | Sashihara |
| 2002/0132590 A1 | 9/2002 | Marshall |
| 2003/0064752 A1 | 4/2003 | Adachi et al. |
| 2003/0236103 A1 | 12/2003 | Tamaki et al. |
| 2004/0028006 A1 | 2/2004 | Kayama et al. |
| 2004/0171402 A1 | 9/2004 | Tamaki et al. |
| 2005/0176382 A1 | 8/2005 | Mochizuki et al. |
| 2005/0245237 A1 | 11/2005 | Adachi et al. |
| 2006/0072530 A1 | 4/2006 | Strutt et al. |
| 2006/0128310 A1 | 6/2006 | Leabman |
| 2009/0135972 A1 | 5/2009 | Tanaka et al. |
| 2010/0037124 A1 | 2/2010 | Hoshi et al. |

FOREIGN PATENT DOCUMENTS

| | | |
|---|---|---|
| JP | 2001-237847 | 8/2001 |
| JP | 2001-257682 | 9/2001 |
| JP | 2001-345809 | 12/2001 |
| JP | 2002-198867 | 7/2002 |
| JP | 2002-325084 | 11/2002 |
| JP | 2003-60562 | 2/2003 |
| JP | 2003-179611 | 6/2003 |
| JP | 2004-32015 | 1/2004 |
| JP | 2004-064113 | 2/2004 |
| JP | 2004-260637 | 9/2004 |
| JP | 2005-175542 | 6/2005 |
| JP | 2005-197765 | 7/2005 |

OTHER PUBLICATIONS

"Information technology—Telecommunications and information exchange between system—Local and metropolitan area networks—Specific requirements—Part 11", ANSI/IEEE Std 802.11, 1999 Edition, R2003.

International Search Report issued May 29, 2007 in the International (PCT) Application PCT/2007/053924.

Office Action issued Sep. 16, 2010 in U.S. Appl. No. 12/281,388.

United States Office Action issued Mar. 8, 2011 in U.S. Appl. No. 12/281,388.

United States Notice of Allowance issued May 17, 2011 in U.S. Appl. No. 12/281,388.

* cited by examiner

PACKET GENERATION,
PACKET TRANSMISSION

RECEIVED SIGNAL STRENGTH INFORMATION

|  |  | RECEIVER STATION | | | |
|---|---|---|---|---|---|
|  |  | 11 | 12 | 13 | 14 |
| TRANSMITTER STATION | 11 | — | R12 | R13 | R14 |
|  | 12 | R21 | — | R23 | R24 |
|  | 13 | R31 | R32 | — | R34 |
|  | 14 | R41 | R42 | R43 | — |

FIG.8A

REQUIRED-CIR INFORMATION

| TRANSMITTER STATION | REQUIRED CIR |
|---|---|
| 11 | CIR1 |
| 12 | CIR2 |
| 13 | CIR3 |
| 14 | CIR4 |

FIG.8B

REQUIRED-CIR INFORMATION

| | | RECEIVER STATION | | | |
|---|---|---|---|---|---|
| | | 11 | 12 | 13 | 14 |
| TRANSMITTER STATION | 11 | — | CIR12 | | |
| | 12 | CIR21 | — | | |
| | 13 | | | — | CIR34 |
| | 14 | | | CIR43 | — |

RECEIVED SIGNAL STRENGTH INFORMATION

| | | RECEIVER STATION | | | |
|---|---|---|---|---|---|
| | | 11 | 12 | 13 | 14 |
| TRANSMITTER STATION | 11 | — | R12 | R13 | R14 |
| | 12 | R21 | — | R23 | R24 |
| | 13 | R31 | R32A R32B | — | R34 |
| | 14 | R41 | R42A R42B | R43 | — |

US 8,724,524 B2

WIRELESS COMMUNICATION APPARATUS AND WIRELESS COMMUNICATION METHOD

This application is a divisional application of Ser. No. 11/916,884, Jun. 12, 2009 now U.S. Pat. No. 8,040,837 which is the National Stage of International Application No. PCT/JP2006/311550, which was filed Jun. 8, 2006.

TECHNICAL FIELD

The present invention relates to a wireless communication apparatus and a wireless communication method that are capable of performing data transmission/reception through a plurality of links at the same time in a wireless communication system in which a plurality of links coexist, so that high space-use efficiency is achieved. Note that the term "link" in this Specification means a transmission of data from a wireless station as a transmitter to a wireless station as a receiver.

BACKGROUND ART

Conventionally, in wireless communication systems that perform packet wireless transmission such as wireless LAN systems, the access control method based on carrier sense (i.e. CSMA method) has been commonly used. For example, Non-patent Document 1 discloses a CSMA/CA method that uses, in addition to the carrier sense based on received-signal strengths, a request-to-send (RTS) packet and a clear-to-send (CTS) packet.

The CSMA/CA method is aimed to avoid packet collisions due to so-called hidden nodes, which cannot be detected by a node but interferes with a communication target of the node.

However, in the CSMA method and the CSMA/CA method, a node that has detected an interference signal by means of the carrier sense function thereof cancels data transmission even though the received-signal strength of the interference signal is so weak that the communication is not obstructed. This is called an "exposed-node problem". Because of this problem, the system as a whole is limited in the transmission capacity.

FIG. 20 is a conceptual system diagram for explaining operations performed through a conventional CSMA method. FIG. 21 is a time sequence diagram showing packet transmissions performed in the system shown in FIG. 20.

In FIG. 20, a wireless station 101 transmits data to a wireless station 102 and a wireless station 103 transmits data to a wireless station 104 based on the CSMA method.

In FIG. 21, the wireless station 103 firstly performs the carrier sense (CS) to start transmission of data, and after confirming that no carrier has been detected, transmits the data to the wireless station 104. Here, if the wireless station 101 attempts to start the transmission of data while the wireless station 103 is transmitting data, the wireless station 101 detects a signal of a data packet transmitted by the wireless station 103, using the carrier sense (CS). Accordingly, the transmission performed by the wireless station 101 will be prohibited. On the other hand, if the wireless station 103 attempts to start the transmission while the wireless station 101 is transmitting data, the wireless station 103 detects a signal from the wireless station 101, using the carrier sense. Accordingly, the transmission performed by the wireless station 103 will be prohibited. With conventional CSMA methods, such a transmission prohibition status is caused even if the strength of the interference signal, transmitted by the wireless station 103 and received by the wireless station 102, is sufficiently lower than the desired signal transmitted by the wireless station 101 and does not obstruct the reception of the desired signal. As a result, it is impossible to improve the transmission capacity of the system as a whole.

To solve this problem, Patent Document 1 discloses a technique wherein the access point discriminates between interference areas and non-interference areas, and allocates different communication periods to wireless stations existing within the interference areas and wireless stations existing in the non-interference areas. Here, the interference areas are, in terms of a wireless station existing therein, areas in which the carrier-to-interference ratio (CIR) between a desired signal transmitted from an access point as a communication target and an interference signal transmitted from another access point is less than the lower limit of the CIR required for establishment of communication (required CIR). The non-interference areas are, in terms of a wireless station existing therein, areas in which the carrier-to-interference ratio (CIR) between a desired signal transmitted from an access point as a communication target and an interference signal transmitted from another access point is equal to or more than the required CIR.

FIG. 22 is a conceptual diagram showing a wireless communication system using the technique disclosed by the above-mentioned Patent Document 1. In FIG. 22, the reference number 200 represents a control station, 201 and 202 represent access points, and 203-206 represent wireless stations. Here, the wireless stations 203 and 205 are communicating with the access point 201, and the wireless stations 204 and 206 are communicating with the access point 202. Each access point judges whether each wireless station exists within the interference area or not, based on the received power from each wireless station, by means of a prescribed procedure using beacon and so on.

In the example of FIG. 22, the wireless station 203 and the wireless station 204 exist in the non-interference areas corresponding to different access points respectively, and both of them can secure the CIR greater than the required CIR even if they perform communications at the same time. Meanwhile, the wireless station 205 and the wireless station 206 exist in the interference areas, and they can not perform communications at the same time. The wireless stations 205 and 206 existing in the interference areas perform time-division communications in the period allocated for the interference areas, using the CSMA in the conventional manner. The wireless stations 203 and 204 existing in the non-interference areas perform communications in the period exclusively allocated for the non-interference areas without performing the carrier sense. As a result, the wireless stations belonging to the different access points can perform communications at the same time in the period exclusively allocated for the non-interference area without causing packet loss. This improves the transmission capacity of the system as a whole.

The Non-patent Document 1 also discloses a technique to avoid packet collisions, based on virtual carrier sense that uses the RTS/CTS and reservation time information. FIG. 23 is a time sequence diagram showing packet transmissions in the case where the communication control method using the RTS/CTS and the reservation time information is applied to the system of FIG. 20.

In FIG. 23, firstly the wireless station 103 performs the carrier sense (CS). Not detecting any carrier, the wireless station 103 transmits an RTS packet to the wireless station 104. The RTS packet includes reservation time information to be used for reservation of a time period until completion of transmission of a data packet to be transmitted and an acknowledgement (ACK) packet corresponding to the data packet.

Upon reception of the RTS packet transmitted from the wireless station 103 to the wireless station 104, the wireless station 101 sets a timer of a network allocation vector (NAV) based on the reservation time information included in the RTS packet, and comes into the transmission prohibition status until the end of the reservation time.

If the wireless station 104 is ready to receive packets and not in the transmission prohibition status, the wireless station 104 transmits a CTS packet to the wireless station 103. Upon reception of the CTS packet from the wireless station 104, the wireless station 103 transmits a data packet to the wireless station 104.

In the case of transmitting two or more data packets in succession, each of the data packets except for the last data packet includes reservation time information for reservation of a time period required for completing transmission of the next data packet and the ACK packet corresponding thereto.

FIG. 23 shows the case where the wireless station 103 transmits two data packets in succession. Based on the reservation time information included in the first data packet, the wireless station 101 updates the time of the NAV, and extends the period of the transmission prohibition status until the time when transmission of the next data packet and the ACK packet is expected to be completed. In this way, in the case where the wireless station 102 and the wireless station 103, or the wireless station 101 and the wireless station 104 are at positions where they can not communicate with each other, it is possible to avoid the packet collisions due to transmission performed at the same time.

With this structure, however, the wireless station 101 stays in the transmission prohibition status for a long time if receiving a signal from the wireless station 103. Accordingly, the transmission prohibition status is caused even though the strength of the interference by the wireless station 103 with the wireless station 102 is sufficiently lower than the strength of the signal transmitted from the wireless station 101 to the wireless station 102 and does not obstruct communications. Therefore, it is impossible for this structure to improve the transmission capacity of the system as a whole.

To solve this problem, Patent Document 2 discloses a technique for improving the transmission capacity of the system as a whole, wherein a wireless station judges whether a signal that the wireless station transmits interferes with other wireless stations based on whether the wireless station receives an RTS packet or a CTS packet, and transmits signals at the same time if they do not interfere with each other.

FIG. 24 is an example of a time sequence of the packet transmissions disclosed in the Patent Document 2. In this example, the following procedures are the same as those shown in FIG. 23: the wireless station 103 transmits an RTS packet; correspondingly the wireless station 104 transmits a CTS packet; and the wireless station 103 transmits the data packet. However, the following are different from FIG. 23: the period between when the wireless station 103 has completed transmission of the data packet and when the wireless station 104 starts transmission of an ACK packet is secured such that an RTS packet can interrupt therein.

In the case where the wireless station 101 has received an RTS packet from the wireless station 103 but has not received a CTS packet corresponding to the RTS packet from the wireless station 104, the wireless station 101 judges that the wireless station 101 and the wireless station 104 are located as not interfering with each other. Accordingly, immediately after the wireless station 103 completes transmission of a data packet, the wireless station 101 transmits an RTS packet to the wireless station 102. The wireless station 102, which has received the RTS packet of the wireless station 101, transmits a CTS packet to the wireless station 101 if signals of the wireless station 103 and the wireless station 104 have not been received. Although this transmission of the CTS packet overlaps with the transmission of the ACK packet from the wireless station 104, the wireless station 101 can receive the CTS packet without any problems because the wireless station 101 is at a position where the wireless station 104 does not interfere with. Subsequently, the wireless station 101 transmits a data packet to the wireless station 102. Although this transmission of the data packet overlaps with the transmission of a data packet from the wireless station 103 to the wireless station 104, the both data packets can be transmitted at the same time because the wireless station 104 is at a position where the wireless station 101 does not interfere with, and the wireless station 102 is at a position where the wireless station 103 does not interfere with.

Patent Document 1: Japanese Laid-open Patent Application Publication No. 2004-260637
Patent Document 2: Japanese Laid-open Patent Application Publication No. 2001-345809
Non-Patent Document 1: ANSI/IEEE Std 802.11, 1999 Edition

SUMMARY OF THE INVENTION

Means for Solving the Problems

However, with the technique disclosed in the Patent Document 1, a centralized-control station is required for collectively managing and controlling information of a plurality of access points. Furthermore, since the communications are performed with dividing time into periods exclusively for interference areas and periods exclusively for non-interference areas, the concurrent transmission can be performed only in particular time periods allocated for the interference areas.

Also, with the technique disclosed in the Patent Document 2, the concurrent transmission can be performed only with a particular positional relation between pairs of wireless stations communicating with each other, where one of a pair of wireless stations is out of reach of the both of another pair of wireless stations communicating with each other, and the other one of the pair of wireless stations is out of reach of one of said another pair of wireless stations communicating with each other. In other words, if at least one of the pair of the wireless stations can receive signals from the both of said another pair of wireless stations communicating with each other, or if the both of the pair of the wireless stations can receive signals from any of said another pair of wireless stations communicating with each other, the concurrent transmission can not be performed, though it is actually possible.

If spatial density of wireless stations increases in accordance with spread of wireless LAN apparatuses, it can be assumed that a large number of wireless stations exist within reach of signals. Also, since a communication method that can select a modulation mode and a code rate often transmits control information of a control packet with use of a modulation mode and a code rate that expands reach of the transmission, the possibility of occurrence of the positional relation enabling the concurrent transmission based on the technique disclosed in the Patent Document 2 is further lowered. As described above, the technique of the Patent Document 2 can realize the concurrent transmission only in extremely limited situations with particular positional relations. Therefore, the technique of the Patent Document 2 has a problem that there is little chance of realizing the concurrent transmission, and improvement of the efficiency is limited.

The object of the present invention is to solve the problems of the conventional techniques mentioned above, and improve the transmission capacity of the system as a whole.

Means for Solving the Problems

To solve the problems described above, an aspect of the present invention is a wireless communication apparatus, comprising: a demodulation unit operable to demodulate a received signal to obtain demodulated data; a link information management unit operable to store therein link parameter information extracted from the demodulated data, and judge whether a link of signal to transmit is concurrently allowable with a link of the received signal, where a link is data transmission from a wireless station to another wireless station; a concurrent transmission link management unit operable to judge whether a link of signal to transmit is concurrently allowable with a link of a signal that is being received, based on concurrent transmission link judgment information received from the link information management unit and wireless station identifier information included in demodulated data obtained by demodulating the signal that is being received, and generate and output a concurrent transmission timing signal based on a result of the judgment; and a transmission unit operable to transmit a signal according to a timing that overlaps reception of the signal that is being received, based on the concurrent transmission timing signal received from the concurrent transmission link management unit.

In the present invention, when a first wireless station communicates with a second wireless station, the second wireless station measures a received-signal strength of a signal transmitted by a third wireless station to a fourth wireless station, stores therein the received-signal strength as received-signal strength information of the third wireless station, and includes the received-signal strength information of the third wireless station into a signal addressed to the first wireless station and transmits the signal to the first wireless station, and the first wireless station extracts link parameter information included in a signal transmitted by the fourth wireless station to the third wireless station, judges whether a transmission link from the third wireless station to the fourth wireless station and a transmission link from the first wireless station to the second wireless station are compatible in concurrent transmission without interference with each other based on the received-signal strength information of the third wireless station received from the second wireless station and the extracted link parameter information, and if judging affirmatively and receiving a header of the signal transmitted by the third wireless station to the fourth wireless station, transmits a signal to the second wireless station according to a timing that overlaps transmission of the signal that is being transmitted by the third wireless station.

Another aspect of another aspect of the present invention is a wireless communication apparatus that transmits data to a wireless station having an interference reduction function to control an interference reduction mode, comprising: a link information management unit operable to judge, based on the carrier-to-interference ratio in at least one type of an interference-reduction mode of the wireless station, whether concurrent transmission between a signal from the wireless communication apparatus to the wireless station and a signal of an interference station is available; and a concurrent transmission link management unit operable to store therein a result of the judgment by the link information management unit, and generates an interference reduction mode control signal for instructing the wireless station to operate in a particular interference reduction mode that enables the concurrent transmission, wherein after transmitting the interference reduction mode control signal to the wireless station, the wireless communication apparatus transmits the signal to the wireless station according to a timing that overlaps transmission of the signal that is being transmitted by the interference station.

Another aspect of the present invention is a wireless communication apparatus comprising: an interference reduction processing unit operable to control an interference reduction mode; and an interference reduction control unit operable to receive an interference reduction mode control signal and determine and control the interference reduction mode showing an operation status of the interference reduction processing unit, based on the received interference reduction mode, wherein the wireless communication apparatus generates interference information that includes an identifier of an interference station that is different from an transmission target, information indicating a type of the interference reduction mode, and received-signal strength of the interference information in the interference reduction mode, and transmits the interference signal to the transmission target.

Another aspect of the present invention is a wireless communication method for transmitting data from a first wireless station having a concurrent transmission control function and a second wireless station having an interference reduction function to control an interference reduction mode, wherein the first wireless station judges, based on a carrier-to-interference ratio (CIR) of the second wireless station in at least one type of an interference reduction mode, whether concurrent transmission between a signal from the first wireless station to the second wireless station and a signal of an interference station is available, and if judging that any particular interference reduction mode enables the concurrent transmission, transmits an interference reduction mode control signal to the second wireless station to instruct the second wireless station to operate in the particular interference reduction mode and transmits the signal to the second wireless station according to a timing that overlaps transmission of the signal that is being transmitted by the interference station.

Preferably, the first wireless station transmits interference station information, indicating a third wireless station as a detected interference station, to the second wireless station, the second wireless station transmits, to the first wireless station, link parameter information that includes a signal strength of the signal of the first wireless station, and interference information that includes an interference reduction mode of the interference station and an interference strength corresponding thereto, and the first wireless station judges whether the concurrent transmission with the interference station is available based on the link parameter information and the interference information.

With the stated structure and method, the wireless communication apparatus pertaining to the present invention autonomously judges whether a link is available for concurrent transmission, and autonomously controls a transmission timing to concurrently establishing a plurality of links. Therefore, it is possible to concurrently establishing a plurality of links even in a system without control under a centralized-control station or a control station, such as an ad-hoc network structure. Also, it is possible to appropriately judge whether concurrent transmission can be established, even if a wireless station as a receiver receives signals of both a wireless station as a transmitter and an interference station, to concurrently establishing a plurality of links. Furthermore, the wireless communication apparatus realizes concurrent transmission by controlling an interference reduction function of a wireless station as a receiver, even if the strength of a signal from an interference station received by a receiver station is unignorable in comparison with the signal from a transmitter station.

Advantageous Effects of the Present Invention

The first aspect of the present invention can improve the transmission capacity by realizing concurrent transmission through a plurality of links without providing a centralized-control station. Also, since each terminal apparatus autonomously judges whether concurrent transmission is available and controls the transmission timing, it is possible to realize concurrent transmission even in a structure without access points, such as an ad-hoc structure. Furthermore, since time for concurrent transmission is not limited, it is possible to more effectively increase the transmission capacity.

The second aspect of the present invention can improve the transmission capacity of the system as a whole, because the wireless communication apparatus performs concurrent transmission based on the CIR, even to a terminal exiting in a range within which a signal from an interference source is reachable with an unignorable strength. Even if the CIR is insufficient in a normal reception status, it is possible to improve the transmission capacity more, because the wireless communication apparatus performs interference reduction by controlling the interference reduction function and increase the CIR, which enables the concurrent transmission. In addition, since each terminal apparatus autonomously judges whether concurrent transmission is available and controls the transmission timing, it is possible to realize concurrent transmission even in a structure without a control station and a base station, such as an ad-hoc structure.

BRIEF DESCRIPTION OF THE DRAWINGS

FIGS. 8A and 8B show required-CIR information to be stored in the wireless communication apparatus pertaining to the first embodiment of the present invention;

Figure 1:
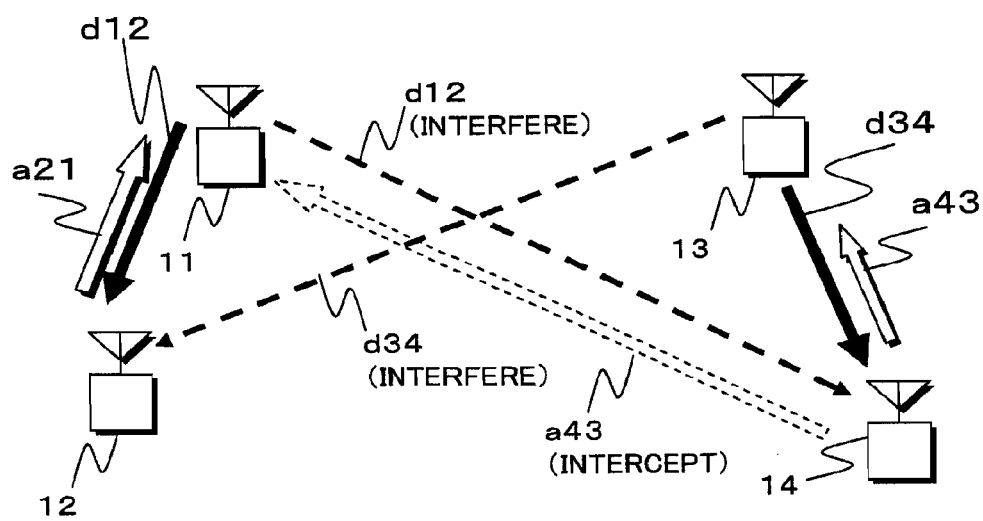
FIG. 1 is a conceptual diagram of a wireless communication system pertaining to the first embodiment of the present invention.

EXPLANATION OF REFERENCES 11-14: wireless stations
41: demodulation unit
42: received-signal strength detection unit
44: link information management unit
45: concurrent transmission link management unit
47: transmission unit
d12 d34: data packets
a21 a43: ACK packets
p: link parameter information
p1: required-CIR information
p2: transmission power information
p3: received-signal strength information
c1: concurrent transmission candidate station information
s1: input signal from antenna
s2: demodulated data
s3: received-signal strength information of received packet
s4: self transmission power information
s7: concurrent transmission link judgment information
s8: extracted received-signal strength information
s9: concurrent transmission timing signal
s10: concurrent transmission packet length information
s12: transmitted signal
s13: transmission power information of demodulated data
s14: received-signal strength estimate value
s15: CIR estimate value
s16: required-CIR information of demodulated data s17: required-CIR information of concurrent transmission candidate link
s18: recorded concurrent transmission link information
s19: wireless station identifier information
s20: packet length information extracted from demodulated data
211-214: wireless stations
244: link information management unit
245: concurrent transmission link management unit
p201: required-CIR information
p202: transmission power information
p203: received-signal strength information
q: interference information
q201: interfering-station identifier
q202: interference strength information
q203: interference reduction mode information
c201: interfering-station information
s203: received-signal strength information of received packet
s204: self transmission power information
s208: extracted received-signal strength information
s213: transmission power information of decoded data
s214: received-signal strength estimate value
s215: CIR estimate value
s216: required-CIR information of decoded data
s217: required-CIR information of concurrent transmission candidate link

DETAILED DESCRIPTION OF THE INVENTION

The following describes embodiments of the present invention with reference to the drawings.

First Embodiment

FIG. 1 is a conceptual diagram of a wireless communication system pertaining to the first embodiment of the present invention. In FIG. 1, the reference letters 11, 12, 13 and 14 represent wireless stations. The wireless station 11 communicates with the wireless station 12, and the wireless station 13 communicates with the wireless station 14. The reference letter d12 represents a data packet transmitted by the wireless station 11 to the wireless station 12. The reference letter d34 represents a data packet transmitted by the wireless station 13 to the wireless station 14. The reference letter a21 represents an ACK packet returned by the wireless station 12 to the wireless station 11 as receipt acknowledgement. The reference letter a43 represents an ACK packet returned by the wireless station 14 to the wireless station 13 as receipt acknowledgement.

Figure 2:
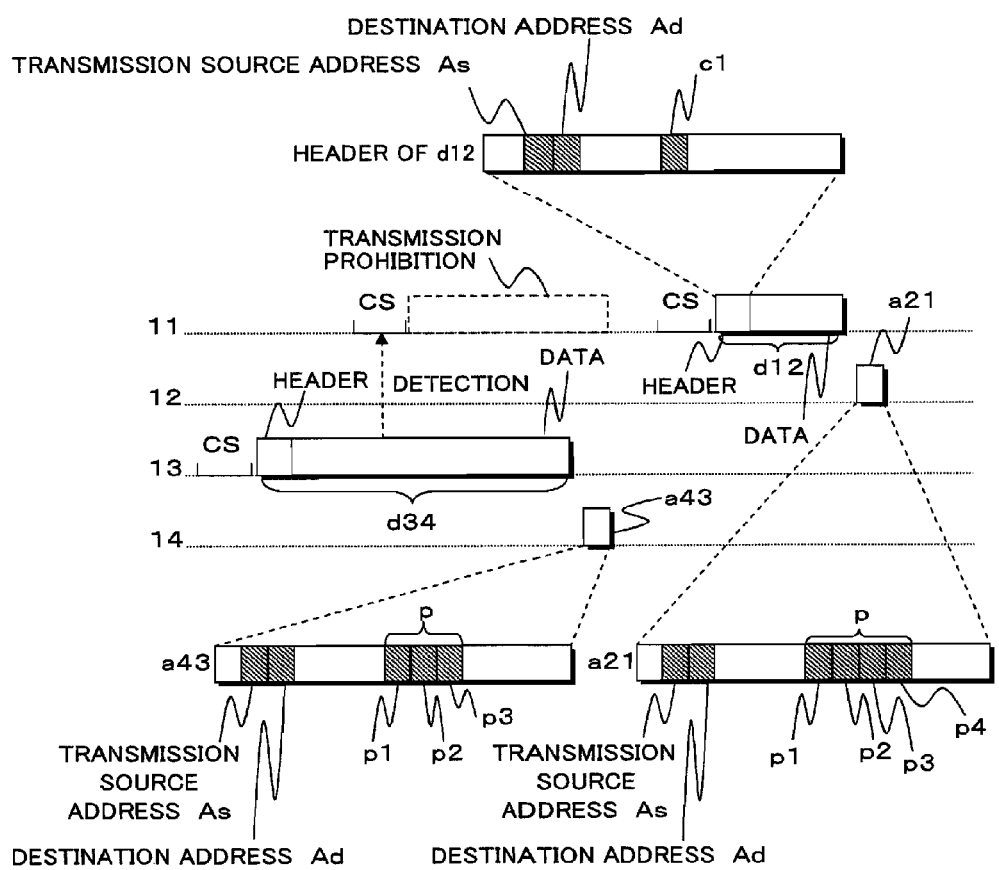
FIG. 2 is a transmission sequence diagram based on a CSMA technique, pertaining to the first embodiment of the present invention.

FIG. 2 shows a transmission sequence based on a CSMA technique at a time before concurrent data packet transmission is started in the wireless communication system of FIG. 1. As illustrated in FIG. 2, in the same manner as in the conventional CSMA technique, carrier sense (CS) is performed for a prescribed time immediately before the data packet is transmitted. The data packet is to be transmitted after it is confirmed that no carrier has been detected.

The wireless station 13 transmits the data packet d34 to the wireless station 14 after the pre-transmission carrier sense is performed. The wireless station 14 that has received the data packet d34 transmits the ACK packet a43 to the wireless station 13. If the wireless station 11 attempts to transmit data to the wireless station 12 while the data packet d34 is being transmitted, the wireless station 11 comes into the transmission prohibition status due to detection of the carrier of the data packet d34 through the carrier sense. Accordingly, the wireless station 11 performs the carrier sense again after the transmission of the data packet d34 and the ACK packet a43 has been completed. After confirming that no carrier has been detected, the wireless station 11 transmits the data packet d12 to the wireless station 12. The wireless station 12 that has received the data packet d12 transmits the ACK packet a21 to the wireless station 11.

Each of the ACK packets a43 and a21 includes a transmission source address As, a destination address Ad and link parameter information p. The link parameter information p includes required-CIR information p1, transmission power information p2 and received-signal strength information p3. For example, the ACK packet a43 includes the following: the minimum value of the CIR required by the wireless station 14 for receiving a signal from the wireless station 13, as the required-CIR information p1; the transmission power for the ACK packet a43, as the transmission power information p2; and the signal power of the signal from the wireless station 14 received by the wireless station 13, as the received-signal strength information p3. The link parameter information p may further include received-signal strength information p4 of a signal received from a concurrent transmission candidate station. FIG. 2 shows an example where the ACK packet a21 includes the received-signal strength information p4 of the signal received from a concurrent transmission candidate station. The information p4 is described later in detail.

Although the required-CIR information p1 is described above as showing the minimum value of the CIR required for establishment of the communication, it may show the total of the minimum value and a prescribed margin. Also, although the received-signal strength information p3 is described above as information showing the received-signal power, it may be received electrical field strength, or a sign showing a graduated level of the received power.

Using the link parameter information p illustrated in FIG. 2, the wireless communication system of the first embodiment attempts to perform concurrent transmission with a plurality of links that satisfy the required CIR, even if any carrier is detected by the carrier sense.

In the following manner, the wireless station 11 autonomously judges, in cooperation with the wireless station 12, whether it is possible to concurrently establish a link from the wireless station 11 to the wireless station 12 with a link from the wireless station 14 to the wireless station 13.

Firstly, when receiving the data packet d34, the wireless station 12 measures the received-signal strength of the data packet d34. Assume that R32 represents this received-signal strength.

Next, when receiving the ACK packet a43, the wireless station 11 measures the received-signal strength of the ACK packet a43. Assume that R41 is the received-signal strength. At the same time, the wireless station 11 extracts the transmission power information p2 from the ACK packet a43, to find the transmission power of the ACK packet a43. Assume that T4 is this transmission power.

Here, assume that T1 is the transmission power of the data packet d12 transmitted from the wireless station 11 to the wireless station 12. Provided the propagation loss amount (propagation loss amount L) of a signal passing through the transmission path from the wireless station 14 to the wireless station 11 is the same as that of the transmission path from the wireless station 11 to the wireless station 14, the wireless station 11 can estimate the received-signal strength R14 at reception of the data packet d12 by the wireless station 14, based on R41, T4 and T1. Specifically, when the transmission power, the received-signal strength and the propagation loss amount are represented with logarithmic representation, such as decibel, it is possible to obtain R14 by subtracting the propagation loss amount L from T1, and obtain R41 by subtracting the propagation loss amount L from T4. Therefore, the received-signal strength R14 can be obtained by: R14=R41+(T1−T4).

However, the value obtained in the above-described manner generally includes error due to several factors such as an error between the transmission power information T1 held by the wireless station 11 and the actual transmission power, a measurement error of the received-signal strength, and an asymmetry property of the propagation loss amount. The value R14 is hereinafter called the estimate value R14 of the received-signal strength.

Note that in the case where the wireless station 14 intercepted in the past a signal transmitted by the wireless station 11, and holds the received-signal strength information of the signal, the wireless station 11 may obtain R14 in the following manner instead of the above-described manner: The wireless station 14 sends a notice of the received-signal strength information R14 to the wireless station 11 by including the information into the ACK packet or the like, and the wireless station 11 extracts and obtains R14. In the former case which estimates R14 by calculation, there is an advantage that the wireless station 11 can obtain the estimate value of R14 even if the wireless station 14 does not send the notice of R14. On the other hand, the error included in the estimate value might be great. Therefore, it is preferable that the estimate value calculated in the former manner is used when R14 is not notified, and the notification information is used when the notification information of R14 has been received. However, as a matter of course, the present invention is available even if structured to always use the estimate value or to use only the notification.

Furthermore, it is possible to obtain the received-signal strength at the time when the data packet d34 is received by the wireless station 14 by extracting the received-signal strength information p3 from ACK packet a43. Assume R34 represents this received-signal strength.

In this way, since the received-signal strength R34 of the signal desired to be received by the wireless station 14 and the received-signal strength estimate value R14 of the interference signal received by the wireless station 14 are obtained, the CIR for the wireless station 14 can be estimated as the difference between the received-signal strength R34 of the desired signal and the received-signal strength estimate value R14 of the interference signal.

Also, it is possible to obtain the required CIR (CIR 34) for the wireless station 14 by extracting the required-CIR information p1 from the ACK packet a43.

If the estimate value of the CIR for the wireless station 14 obtained in the above-described manner is equal to or more than the total of the value of the CIR 34 and a prescribed margin, the wireless station 11 can judge that the possibility that the link from the wireless station 11 to the wireless station 12 interferes the link from the wireless station 13 to the wireless station 14 is low. Here, the prescribed margin is a value determined in consideration of changes and variations in properties of the receiver, and the case where other interference signals and noises coexist. Note that if the margin has been included in the required-CIR information p1 as mentioned above, the wireless station 11 can make a judgment without considering the margin.

Here, the wireless station 11 recognizes the link from the wireless station 13 to the wireless station 14 as a link as a concurrent transmission candidate link from the wireless station 11 to the wireless station 12. To judge whether concurrent establishment of the link from the wireless station 13 to the wireless station 14 and the link from the wireless station 11 to the wireless station 12 is possible, it is necessary for the wireless station 12 to judge whether the interference signal from the wireless station 13 is smaller enough than the desired signal from the wireless station 11. The following explain procedures to be performed for this judgment.

Before transmitting the data packet d12 to the wireless station 12, the wireless station 11 includes concurrent transmission candidate station information c1 into the packet header thereof. Here, the concurrent transmission candidate station information c1 is information indicating the wireless station 13. Generally, a wireless station address is used for this purpose.

Upon reception of the data packet d12 including the concurrent transmission candidate station information c1, the wireless station 12 includes the received-signal strength information p4 into the ACK packet a21 if possible, and transmits the ACK packet a21. The ACK packet a21 includes, as the information p4, information that indicates the received-signal strength, measured by the wireless station 12, of the data packet d23 transmitted by the wireless station 13 indicated by the concurrent transmission candidate station information c1. In the case of FIG. 2, the received-signal strength information p4 of the signal received from the concurrent transmission candidate station corresponds to the received-signal strength information R32 that has been measured by the wireless station 12. Accordingly, the wireless station 12 includes the received-signal strength information R32 into the ACK packet a21, as the received-signal strength information p4, and transmits the ACK packet a21 to the wireless station 11. Note that if the wireless station 12 does not hold any information corresponding to the received-signal strength information p4 because it has not been measured for example, the wireless station 12 transmits the normal ACK packet which does not include the received-signal strength information p4 of the signal received from the concurrent transmission candidate station.

Next, if the ACK packet a21 includes the received-signal strength information p4, the wireless station 11 extracts the received-signal strength information p4 to obtain the received-signal strength information R32, and also extracts the received-signal strength information p3 to obtain the received-signal strength information R12 of the data packet d12. In such a manner, since the received-signal strength R12 of the desired signal to be received by the wireless station 12 and the received-signal strength R32 of the interference signal have been obtained, the CIR at the wireless station 12 can be estimated as the difference between R12 and R32.

Furthermore, it is possible to obtain the required CIR (CIR 12) for the wireless station 12 by extracting the required-CIR information p1 from the ACK packet a21.

If the estimate value of the CIR for the wireless station 14 obtained in the above-described manner is equal to or more than the total of the value of the CIR 12 and a prescribed margin, the wireless station 11 can judge that the link from the wireless station 11 to the wireless station 12 can be established without being interfered with by the link from the wireless station 13 to the wireless station 14.

In the above-described manner, through the sequence shown in FIG. 2, the wireless station 11 judges that it is possible to concurrently establish the link from the wireless station 11 to the wireless station 12 and the link from the wireless station 13 to the wireless station 14, and records this therein as concurrent link information.

Figure 3:
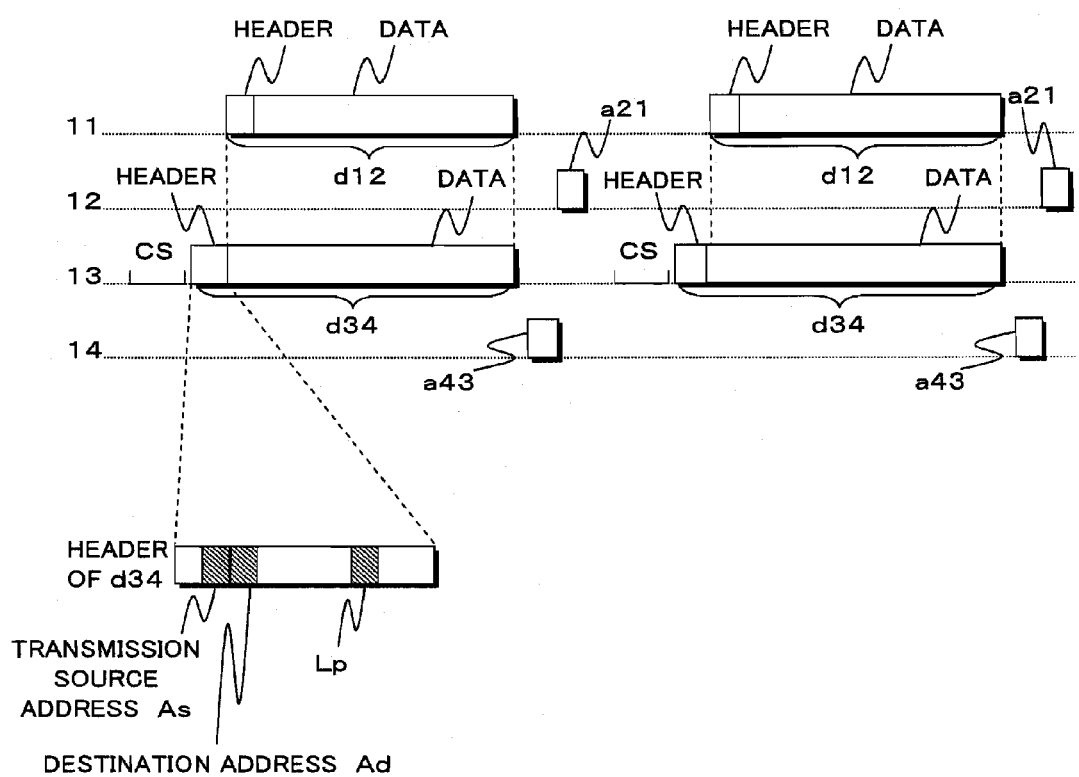
FIG. 3 is a transmission sequence diagram showing concurrent transmission, pertaining to the first embodiment of the present invention.

FIG. 3 shows a sequence that follows the sequence shown in FIG. 2, which is of a concurrent transmission of data packets through the link from the wireless station 13 to the wireless station 14 and the link from the wireless station 11 to the wireless station 12.

As illustrated in FIG. 3, the wireless station 13 firstly transmits the data packet d34 to the wireless station 14 based on the CSMA method. The header of the data packet d34 includes a transmission source address As, a destination address Ad and packet length information Lp. The wireless station 11 intercepts the header of the data packet d34, and analyzes and compares the wireless station identifier information with the concurrent link information recorded therein to judge that the link from the wireless station 13 to the wireless station 14 can be concurrently established with the link from the wireless station 11 to the wireless station 12. In this regard, the wireless station 11 also extracts the packet length information included in the header.

Upon completion of the extraction of the above-mentioned information from the header, the wireless station 11 transmits the data packet d12 to the wireless station 12 such that the data packet d12 overlaps with the data packet d34 in terms of time. In this regard, the wireless station 11 controls the data length of the data packet d12 based on the extracted packet information Lp such that the transmission of the data packet d12 completes at the same time as the completion of the transmission of the data packet d34. By adjusting the transmission times of the links for the concurrent transmission to be the same, it is possible to increase the period in which the concurrent transmission is performed, and more effectively improve the transmission capacity. It is possible to realize such concurrent transmission via a plurality of links by repeating the procedures described above. Note that address information is generally used as the wireless station identifier information.

Also note that information showing that concurrent transmission is being performed is included into the data packet d12 being transmitted through concurrent transmission. Based on this information, the wireless station 12 transmits the ACK packet a21 after waiting for a time that requires for the completion of the normal ACK transmission, instead of transmitting the ACK packet a21 immediately after the data packet d12 is received. As a result, it is possible to avoid collision of the ACK packet a21 with the ACK packet a43. The wireless station 11 also can intercept the ACK packet and update the link parameter information such as the received-signal strength R41.

The wireless station 12 receives the header of the data packet d34 immediately before the concurrent transmission is started, and updates the received-signal strength R32.

The easiest way to update the link parameter information held by each wireless station is to have the wireless station hold only the newest information. However, the newest information is not reliable in some cases, due to measurement error, temporal noises, temporal change of transmission paths, and so on. Therefore, in some cases, it is preferable to have the wireless station hold and use an average of plural parameters recently used. For the calculation of the average, several average methods are available. For example, the following are available: a method of taking the average of prescribed times, a method for taking the average in a prescribed period, a method of multiplying the average at the last minutes by a forgetting factor that is less than 1, adding the newest value to the multiplication result, and normalizing the addition result.

The link parameter information should be notified to an unspecified number of wireless stations. Therefore, it is possible to notify the link parameter information with use of dedicated broadcast or multicast notification packets, instead of transmitting the link parameter information by including it in the ACK packet or the like addressed to a specific wireless station. If this is the case, there is an advantage that it is possible to notify the link parameter information at any time regardless of the transmission timing of data packets and ACK packets. On the other hand, the method of notifying the link information by including it in the header of the ACK packet or the data packet addressed to a specific wireless station, there is an advantage that overhead that consumes transmission capacity can be reduced because a dedicated notification packet is not required. To take the both advantages, it is preferable to usually transmit the link parameter information by including it in the ACK packet or the like, and transmit the link parameter information with use of the notification packets only when the ACK packet or the like has not been transmitted for a long time. As a matter of course, it is possible to include the link parameter information to any packet other than the ACK packet.

Next, the structure of the wireless station pertaining to the first embodiment of the present invention is explained.

Figure 4:
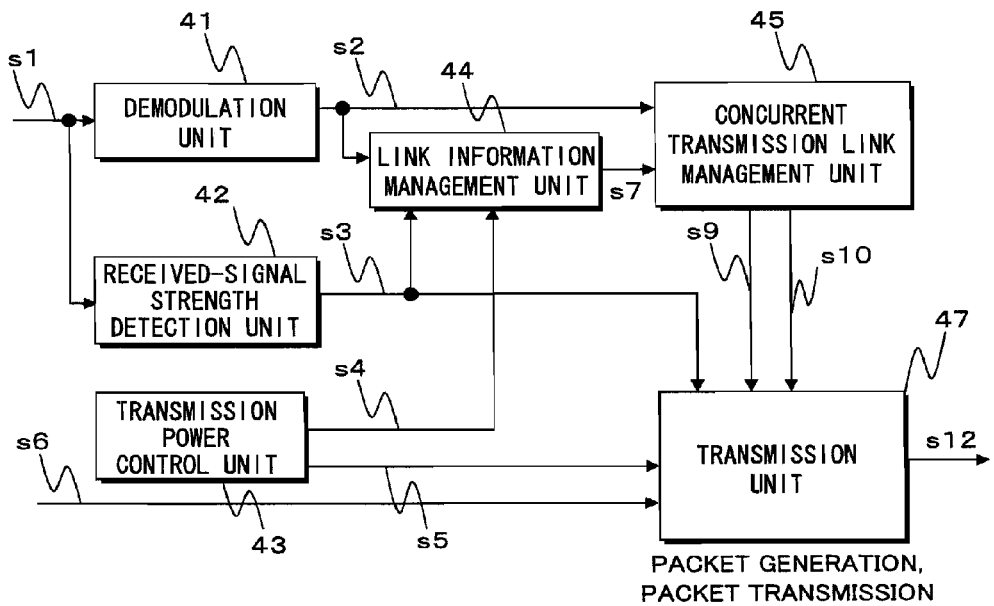
FIG. 4 shows a structure of a wireless communication apparatus pertaining to the first embodiment of the present invention.

FIG. 4 is an example structure of a wireless communication apparatus of the wireless station pertaining to the first embodiment of the present invention. In FIG. 4, the reference letter 41 represents a demodulation unit, 42 represents a received-signal strength detection unit, 43 represents a transmission power control unit, 44 represents a link information management unit, 45 represents a concurrent transmission link management unit, 47 represents a transmission unit, s1 represents an input signal from an antenna, s2 represents demodulated data, s3 represents a received-signal strength information of a received packet, s4 represents a transmission power information of the wireless station, s5 represents a transmission power control signal, s6 represents a transmission data, s7 represents concurrent transmission link judgment information, s9 represents a concurrent transmission timing signal, s10 represents concurrent transmission packet length information, and s12 represents a transmission signal.

The demodulation unit 41 receives and demodulates the input signal s1 from the antenna to obtain demodulated data. The demodulated data includes the header information of the transmitted packet.

The received-signal strength detection unit 42 measures the received-signal strength of the received packet, and outputs the received-signal strength information s3.

The link information management unit 44 extracts the link parameter information, such as the received-signal strength information, from the demodulated data s2. The link information management unit 44 also estimates the received-signal strength of the link that cannot be extracted from the demodulated data s2, using the measured received-signal strength s3 and the transmission power information s4 of the wireless station, and stores therein the estimated received-signal strength. Based on these pieces of information, the link information management unit 44 judges whether the links are available for the concurrent transmission, and outputs the concurrent transmission link judgment information s7.

The concurrent transmission link management unit 45 extracts the wireless station identifier information from the packet header of the demodulated data s2, and stores therein the identifier information as information of the links that are available for the concurrent transmission, based on the concurrent transmission link judgment information s7. The concurrent transmission link management unit 45 also judges whether the link of the signal currently being received is available for the concurrent transmission by comparing the wireless station identifier information extracted from the packet header of the demodulated data s2 with pieces of the concurrent transmission link information recorded in the past. If judging that the link is available for the concurrent transmission, the concurrent transmission link management unit 45 outputs the concurrent transmission timing signal used for performing the concurrent transmission. Furthermore, the concurrent transmission link management unit 45 extracts the packet length information from the packet header of the demodulated data s2. Based on the packet length information, the concurrent transmission link management unit 45 determines the packet length of the packet to be subject to the concurrent transmission (concurrent transmission packet) such that the transmission of the concurrent transmission packet completes at the same time as the end of the transmission of the packet currently being transmitted, and outputs the length as the packet length information.

The transmission unit 46 receives the transmission data s6, generates a packet, and generates and transmits the transmission signal s12. When complying with the CSMA procedures, the transmission unit 46 performs the carrier sense based on the received-signal strength s3 to judge whether to perform the transmission. However, in the case of having received the concurrent transmission timing signal from the concurrent transmission link management unit 45, the transmission unit 46 judges to immediately perform the concurrent transmission regardless of the result of the carrier sense, and generates a packet based on the concurrent transmission timing signal s9 and the packet length information s10, and transmits the generated packet.

The transmission power control unit 43 determines the power used by the wireless station to transmit the transmission signal, and controls the transmission unit 46 by giving the transmission power control information s5 to the transmission unit 46. At the same time, the transmission power control unit 43 gives the transmission power information s4 of the wireless station to the link information management unit 44.

Figure 5:
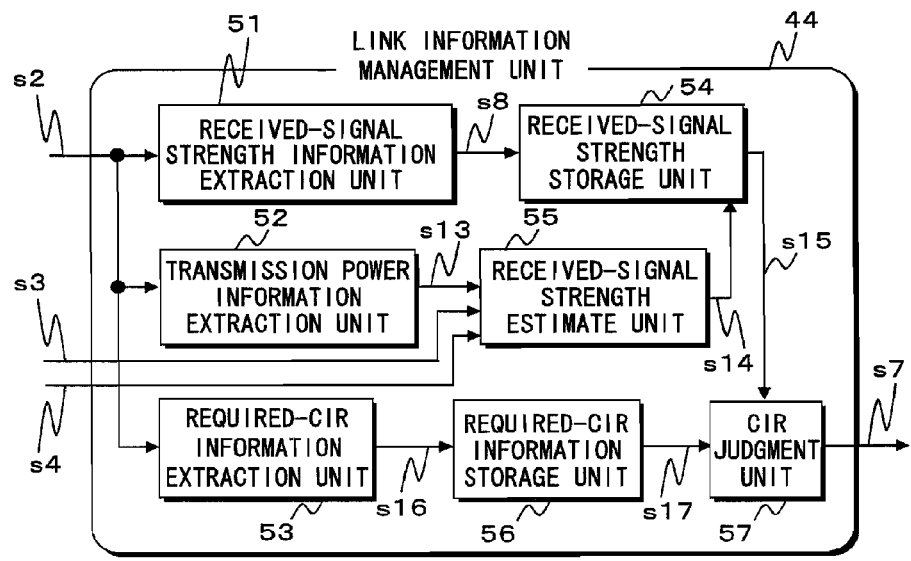
FIG. 5 shows a structure of a link information management unit pertaining to the first embodiment of the present invention.

FIG. 5 shows an example structure of the link information management unit 44 of FIG. 4. In FIG. 5, the reference letter 51 represents a received-signal strength information extraction unit, 52 represents a transmission power information extraction unit, 53 represents a required-CIR information extraction unit, 54 represents a received-signal strength storage unit, 55 represents a received-signal strength estimate unit, 56 represents a required-CIR information storage unit, 57 represents a CIR judgment unit, s8 represents received-signal strength information extracted from the demodulated data s2, s13 represents transmission power information extracted from the demodulated data s2, s14 represents a received-signal strength estimate value, s15 represents a CIR estimate value, s16 represents required-CIR information extracted from the demodulated data s2, and s17 represents required-CIR information of the concurrent transmission candidate link. Explanations of other reference letters that are same as those in FIG. 4 are omitted here.

The received-signal strength information extraction unit 51, the transmission power information extraction unit 52 and the required-CIR information extraction unit 53 respectively extract the received-signal strength information s8, the transmission power information s13, and the CIR information s16 from the demodulated data s2.

The received-signal strength estimate unit 55 estimates the received-signal strength of the signal to be transmitted by the wireless station and received by another wireless station as the transmission source of the received signal based on the received-signal strength s3 of the received signal, the transmission power information s13 at said another wireless station as the transmission source of the received signal, and the transmission power information s4 of the wireless station that has received the signal. Then, the received-signal strength estimate unit 55 outputs the received-signal strength estimate value s14.

The received-signal strength storage unit 54 estimates the CIR at the wireless station as the transmission source of the received signal in the case where the concurrent transmission is performed based on the received-signal strength information s8 extracted from the demodulated data s2 and the received-signal strength estimate value s14 estimated by the received-signal strength estimate unit 55. Then, the received-signal strength storage unit 54 outputs the CIR estimate value s15.

The required-CIR information storage unit 56 stores therein the required-CIR information s16 extracted from the demodulated data s2.

The CIR judgment unit 57 judges whether the link of the signal currently being received is available for the concurrent transmission, based on the CIR estimate value s15 and the required-CIR information s16, and outputs the judgment result as the concurrent transmission link judgment information s7.

Figures 6, 7:
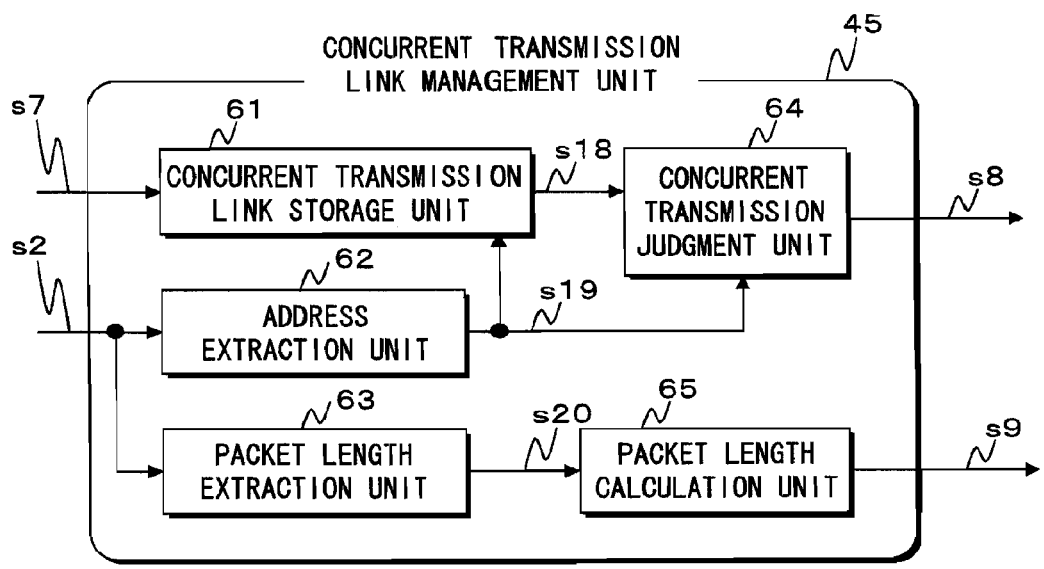
FIG. 6 shows a structure of a concurrent transmission link management unit pertaining to the first embodiment of the present invention.
FIG. 7 shows received-signal strength information to be stored in the wireless communication apparatus pertaining to the first embodiment of the present invention.

FIG. 6 shows an example structure of the concurrent transmission link management unit 45 of FIG. 4. In FIG. 6, the reference letter 61 represents a concurrent transmission link storage unit, 62 represents an address extraction unit, 63 represents a packet length extraction unit, 64 represents a concurrent transmission judgment unit, 65 represents a packet length calculation unit, s18 represents concurrent transmission link information that has been recorded, s19 represents wireless station identifier information (address information), and s20 represents packet length information extracted from the demodulated data s2.

The address extraction unit 62 extracts the wireless station identifier information s19 from the demodulated data s2.

The concurrent transmission link storage unit 61 stores the address of the signal currently being received as information of the link that is available for the concurrent transmission, based on the concurrent transmission judgment information s7.

The concurrent transmission judgment unit 64 compares the wireless station identifier information s19 with the concurrent transmission link information s18 that has already been recorded therein, to judge whether the link of the signal currently being received is available for the concurrent transmission. If it is available for the concurrent transmission, the concurrent transmission judgment unit 64 outputs the concurrent transmission timing signal s9.

The packet length extraction unit 63 extracts the packet length information s20 from the demodulated data s2.

The packet length calculation unit 65 calculates the concurrent transmission packet such that the packet length is decreased for the delay of the concurrent transmission start, based on the extracted packet length information s20, and outputs the packet length as the packet length information s10. In other words, the packet length is determined such that the transmission end times of the packet currently being received and the concurrent transmission packet to be transmitted are almost the same.

With the stated structure, the wireless station pertaining to the first embodiment can realize the concurrent transmission sequence for a plurality of links as explained above based on FIG. 2 and FIG. 3. Note that each of the units illustrated in FIG. 4 to FIG. 6 may be structured as hardware, or as a processor and software executed by the processor.

FIG. 7 shows an example of pieces of the received-signal strength information stored by the received-signal strength storage unit 54 of FIG. 5. In the table of FIG. 7, R12 for example is a received-signal strength of the signal transmitted from the wireless station 11 to the wireless station 12, measured at the wireless station 12. These received-signal strengths include received-signal strengths extracted from the demodulated data of the received packet, received-strength estimate values estimated based on other information, and received-signal strength measured values measured by the wireless station. Specifically, in the case of the sequence explained above base on FIG. 2 and FIG. 3, R12 and R13 are extracted from the packet of the wireless station 12, and R34 is extracted from the packet of the wireless station 14. R13 is a value estimated based on the received-signal strength estimate value of the packet of the wireless station 13, the transmission power information extracted from the packet of the wireless station 13 and the transmission power information of the wireless station 11. R21, R31 and R41 are received-power strengths of the signals respectively transmitted by the wireless stations 12, 13 and 14, measured by the wireless station 11. If the interception results of packets other than those illustrated in FIG. 2 to FIG. 3 are used, R42 and R43 can be extracted for example, and R14 can be estimated. In this way, while receiving and intercepting packets, by storing each piece of received-signal strength information and constantly updating the information when new information is obtained, it is possible to increase the reliability of the data shown in the table of FIG. 7.

FIG. 8 shows an example of the required-CIR information stored in the required-CIR information storage unit of FIG. 5. The required CIR is basically determined by the signal mode consisted of a combination of a modulation method, a code method, a code rate, and so on. If the signal mode of a signal transmitted by each wireless station does not change, the require CIR for the signal of each wireless station is constant regardless of the destination. If this is the case, only one piece of the required-CIR information is required to be stored for each wireless station as the transmission source, as FIG. 8A shows. However, if it is necessary to change the signal mode depending on the destination, or if it is desired to consider the difference among the reception performances of the wireless stations, it is necessary to store pieces of required-CIR information according to combinations of the wireless station as the transmitter and the wireless station as the receiver, as FIG. 8B shows. In the explanation using FIG. 2, the wireless station as the receiver relating to the link includes the required-CIR information of the wireless station into the ACK packet or the like and transmits the required CIR. However, it is possible that the wireless station as the transmitter relating to the link includes the required-CIR information into a packet and transmits the packet, and the wireless station that intercepts the packet extracts the required-CIR information.

Also, the required-CIR information may indicate the signal mode, instead of the required CIR value. For example, the SIGNAL field of the PHY header according to the ANSI/IEEE Std 802.11 (Non-patent Document 1), which is the standard for wireless LAN, may be used as the required-CIR information. If this is the case, although there is a disadvantage that it is impossible to take the difference among the reception performances in the consideration, it is unnecessary to prepare a data field specific to the required-CIR information. Therefore, there is an advantage that the number of the overheads can be decreased, and the capacity of the required-CIR information storage unit can be small.

Second Embodiment

Figure 9:
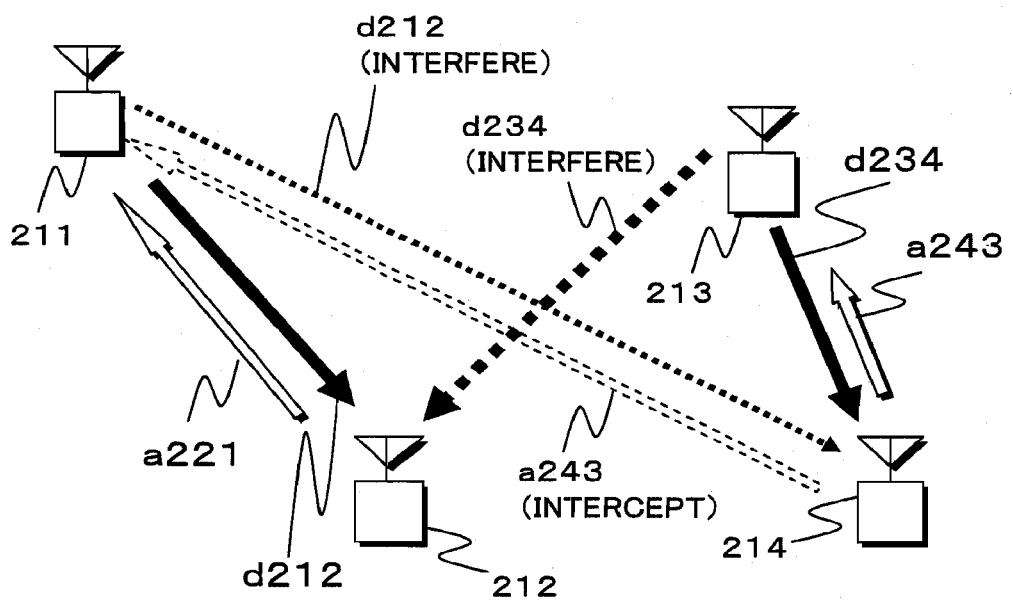
FIG. 9 is a conceptual diagram of a wireless communication system pertaining to the second embodiment of the present invention.

FIG. 9 shows a concept of a wireless communication system pertaining to the second embodiment. In FIG. 9, reference letters 211, 212, 213 and 214 represent wireless stations. The wireless station 211 communicates with the wireless station 212, and the wireless station 213 communicates with the wireless station 214. The reference letter d212 represents a data packet transmitted by the wireless station 211 to the wireless station 212. The reference letter d234 represents a data packet transmitted by the wireless station 213 to the wireless station 214. The reference letter a221 represents an ACK packet returned by the wireless station 212 to the wireless station 211 as receipt acknowledgement. The reference letter a243 represents an ACK packet returned by the wireless station 214 to the wireless station 213 as receipt acknowledgement. Among these wireless stations, at least the wireless station 212 has an interference reduction mechanism that reduces the strength of a reference signal at reception of signals.

Figure 10:
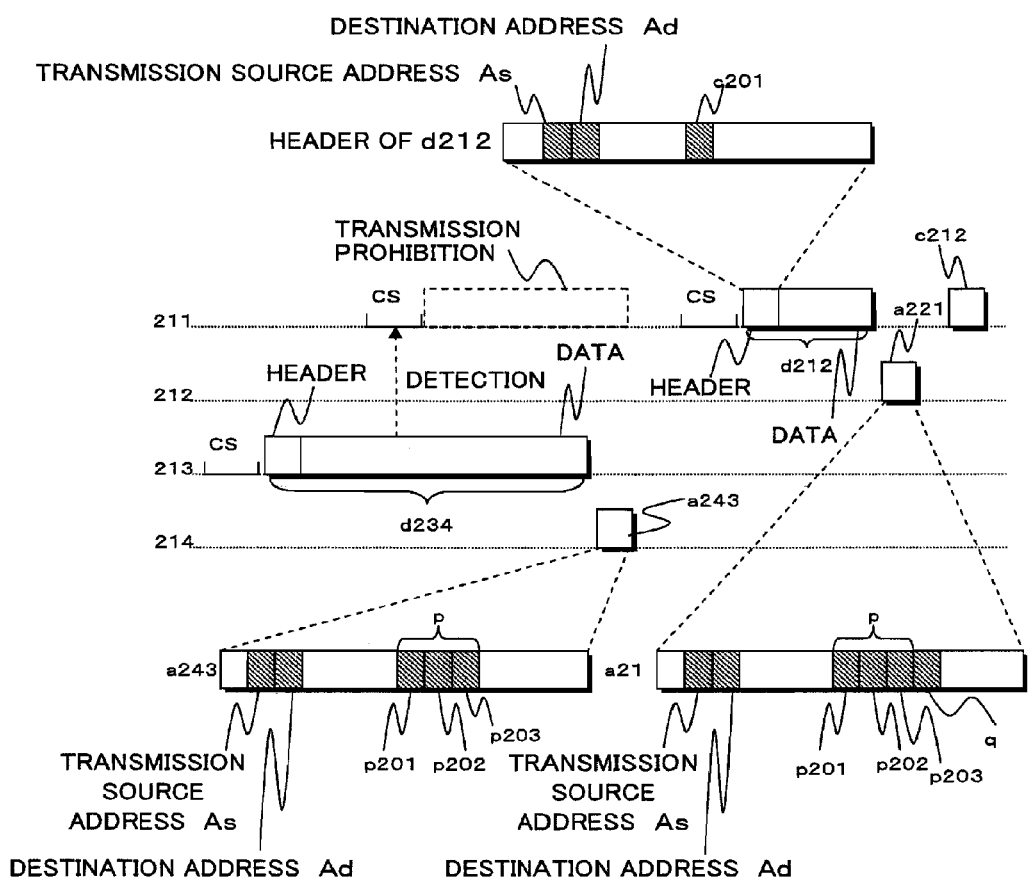
FIG. 10 is a transmission sequence diagram based on the CSMA, pertaining to the second embodiment of the present invention.

FIG. 10 shows a transmission sequence of the wireless communication system of FIG. 9, which is based on a CSMA technique. As illustrated in FIG. 10, in the same manner as in the conventional CSMA technique, carrier sense (CS) is performed for a prescribed time immediately before the data packet is transmitted. The data packet is to be transmitted after it is confirmed that no carrier has been detected.

The wireless station 213 transmits the data packet d234 to the wireless station 214 after the pre-transmission carrier sense is performed. The wireless station 214 that has received the data packet d234 transmits the ACK packet a243 to the wireless station 213. If the wireless station 211 attempts to transmit data to the wireless station 212 while the data packet d234 is being transmitted, the wireless station 211 comes into the transmission prohibition status due to detection of the carrier of the data packet d234 through the carrier sense. At this moment, the wireless station 211 recognizes and records the wireless station 213 as an interference station.

The data packet d234 transmitted by the wireless station 213 might be received by the wireless station 212. If the wireless station 212 intercepts the data packet d234, the wireless station 212 recognizes the wireless station 213 as an interference station, and stores therein the identifier indicating the interference station and measures the received-signal strength of the data packet d234. Also, while intercepting the data packet d234, the wireless station 212 switches operations of an interference reduction processing unit, which is described later, and stores therein interference powers respectively corresponding to the operations. Specifically, the wireless station 212 stores an interference power in the case where the interference reduction function is effective, and an interference power in the case where the interference reduction function is ineffective. This is merely an example, and the wireless station 212 may store interference powers corresponding to more kinds of operation statuses.

The wireless station 211 performs the carrier sense again after the transmission of the data packet d234 and the ACK packet a243 has been completed. After confirming that no carrier has been detected, the wireless station 211 transmits the data packet d212 to the wireless station 212. The packet header of the data packet d212 includes interference station information c201 that is based on the information of the interference station recorded by the wireless station 211. Here, the interference station information c201 is information indicating the wireless station 213. Generally, a wireless station address is used for this purpose.

The wireless station 212 that has received the data packet d212 transmits the ACK packet a221 to the wireless station 211.

Each of the ACK packets a243 and a221 includes a transmission source address As, a destination address Ad, link parameter information p and interference information q. The link parameter information p includes required-CIR information p201, transmission power information p202 and received-signal strength information p203. For example, the ACK packet a243 includes the following: the minimum value of the CIR required by the wireless station 214 for receiving a signal from the wireless station 213, as the required-CIR information p201; the transmission power for the ACK packet a243, as the transmission power information p202; and the signal power of the signal from the wireless station 214 received by the wireless station 213, as the received-signal strength information p203.

FIG. 11 shows the structure of the interference information q. In FIG. 11, the reference character q201 represents an interference station identifier, q202 represents interference strength information, and q203 represents interference reduction mode information. The interference information q includes one or more pieces of the interference station identifier q201, one or more pieces of the interference strength information q202, and one or more pieces of the interference reduction mode information q203. Generally, two pairs of q202 and q202, respectively for the case where the interference reduction function is effective and the case where the interference reduction function is ineffective, are included in correspondence with one interference station identifier g201. However, more number of pairs of the information corresponding to more kinds of the interference reduction modes may be included. Also, a plurality of sets of q201 to q203 relating to different interference stations may be included at the same time.

Although the required-CIR information p201 is described above as showing the minimum value of the CIR required for establishment of the communication, it may show the total of the minimum value and a prescribed margin. Also, although the received-signal strength information p203 is described above as information showing the received-signal power, it may be received electrical field strength, or a sign showing a graduated level of the received power. As the interference strength information q202, information corresponding to a received-signal power of the interference signal (hereinafter called an interference power) is generally used. However, it is possible to use the CIR which is a ratio between the received-signal power of the data packet d212 as a desired signal and the interference power of the data packet d234 as an interference signal. Also, the margin of the CIR with respect to the required CIR may be used.

Using the link parameter information p illustrated in FIG. 10, the wireless communication system of the second embodiment attempts to perform concurrent transmission with a plurality of links that satisfy the required CIR, even if any carrier is detected by the carrier sense.

In the following manner, the wireless station 211 autonomously judges, in cooperation with the wireless station 212, whether it is possible to concurrently establish a link from the wireless station 211 to the wireless station 212 with a link from the wireless station 214 to the wireless station 213.

When intercepting the data packet d234, the wireless station 214 measures the interference power of the data packet d234 in both cases where the interference reduction function is effective and where the interference reduction function is ineffective. Assume that R32A is the interference power in the case where the interference reduction function is effective, and R32B is the interference power in the case where the interference reduction function is ineffective.

Next, when receiving the ACK packet a243, the wireless station 211 measures the received-signal strength of the ACK packet a243. Assume that this received-signal strength is R41.

At the same time, the wireless station 211 extracts the transmission power information p202 from the ACK packet a243, to find the transmission power of the ACK packet a243. Assume that this transmission power is T4.

Here, assume that T1 is the transmission power for the data packet d212 transmitted from the wireless station 211 to the wireless station 212. Provided the propagation loss amount (propagation loss amount L) of signals passing through the transmission path from the wireless station 214 to the wireless station 211 is the same as that of the transmission path from the wireless station 211 to the wireless station 214, the wireless station 11 can estimate the received-signal strength R14 at reception of the data packet d212 by the wireless station 214, based on R41, T4 and T1. Specifically, when the transmission power, the received-signal strength and the propagation loss amount are represented with logarithmic representation, such as decibel, it is possible to obtain R14 by subtracting the propagation loss amount L from T1, and obtain R41 by subtracting the propagation loss amount L from T4. Therefore, the received-signal strength R14 can be obtained by: R14=R41+(T1−T4).

However, the value obtained in the above-described manner generally includes error due to several factors such as the error between the transmission power information T1 held by the wireless station 211 and the actual transmission power, the measurement error of the received-signal strength and the asymmetry property of the propagation loss amount. The value R14 is hereinafter called the estimate value R14 of the received-signal strength.

Note that in the case where the wireless station 214 intercepted in the past a signal transmitted by the wireless station 211, and holds the received-signal strength information of the signal, the wireless station 211 may obtain R14 in the following manner instead of the above-described manner: The wireless station 214 sends a notice of the received-signal strength information R14 by including the information in the ACK packet or the like, and the wireless station 211 extracts and obtains R14. In the former case which estimates R14 by calculation, there is an advantage that the wireless station 211 can obtain the estimate value of R14 even if the wireless station 214 does not send the notice of R14. On the other hand, the error included in the estimate value might be great. Therefore, it is preferable that the estimate value calculated in the former manner is used when R14 is not notified, and the notification information is used when the notification information of R14 has been received. However, as a matter of course, the present invention is available even if structured to always use the estimate value or to use only the notification.

Furthermore, it is possible to obtain the received-signal strength at the time when the data packet d234 is received by the wireless station 214 by extracting the received-signal strength information p203 from ACK packet a243. Assume that this received-signal strength is R34.

In this way, since the received-signal strength R34 of the signal desired to be received by the wireless station 214 and the received-signal strength estimate value R14 of the interference signal received by the wireless station 214 are obtained, the CIR for the wireless station 214 can be estimated as the difference between the received-signal strength R34 of the desired signal and the received-signal strength estimate value R14 of the interference signal.

Also, it is possible to obtain the required CIR (as CIR 34) for the wireless station 14 by extracting the required-CIR information p1 from the ACK packet a43.

If the estimate value of the CIR for the wireless station 214 obtained in the above-described manner is equal to or more than the total of the value of the CIR 34 and a prescribed margin, the wireless station 211 can judge that the possibility that the link from the wireless station 211 to the wireless station 212 interferes the link from the wireless station 213 to the wireless station 214 is low. Here, the prescribed margin is a value determined in consideration of changes and variations in properties of the receiver, and the case where other interference signals and noises coexist. Note that if the margin has been included in the required-CIR information p201 as mentioned above, the wireless station 211 can make a judgment without considering the margin.

The following explain procedures to be performed for judging whether the interference signal from the wireless station 213 is smaller enough than the desired signal from the wireless station 211.

Before transmitting the data packet d212 to the wireless station 12, the wireless station 211 includes the interference station information c201 into the packet header thereof. Here, interference station information c201 is information indicating the wireless station 213. Generally, a wireless station address is used for this purpose.

Figure 11A:
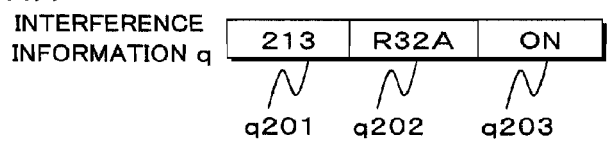
FIGS. 11A and 11B show structures of interference information pertaining to the second embodiment of the present invention.
Figure 11B:
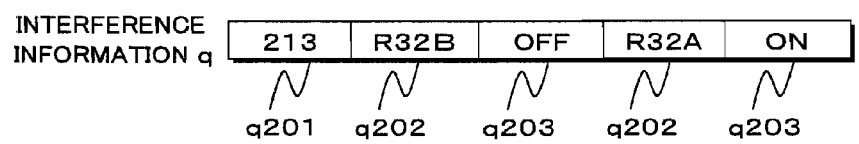

Upon receiving the data packet d212 including the interference station information c201, the wireless station 212 includes the link parameter information p and the interference information q into the ACK packet a221 and transmits the ACK packet a221. The interference information q includes information corresponding to one or more interference reduction modes available at the moment in relation to the wireless station 213 as the interference station indicated by the interference station information c201. If the interference information is not stored because the data packet d234 has not been received, a default value is used as the interference power. The default value is preferably a normal value at the level of internal noises. As FIG. 11A and FIG. 11B show, the interference information q is specifically constituted of the interference station identifier q201 indicating the wireless station 213, the interference power information R32A or R32B and the interference reduction mode information (On or Off). In the case where the transmission power and the transmission method such as the modulation method and the code rate of the data packet to be transmitted by the wireless station 11 is constant, if the required CIR is satisfied only when the interference reduction is effective, it is preferable that the interference information q includes only mode information for the case where the interference reduction is effective (On) as FIG. 11A shows. If the required CIR is also satisfied when the interference reduction is ineffective, it is preferable that the interference information q includes mode information relating to both cases where the interference reduction is effective (On) and the interference reduction is ineffective (Off) as FIG. 11B shows. However, in the case where there is room to increase the transmission power or it is possible to change the transmission mode, it is preferable that the interference information q includes a plurality of information groups relating to available interference reduction modes regardless of the CIR even if the required CIR is not satisfied with particular transmission powers and transmission modes, because it is possible to satisfy the required CIR by changing the transmission power and the transmission mode.

Upon receiving the ACK packet a221, the wireless station 211 calculates, for each of the interference reduction modes of the wireless station 212, calculates the CIR margin in the case where the wireless station 212 receives the signal from the wireless station 211 together with the interference signal from the wireless station 211. The received-signal power of the signal from the wireless station 211 received by the wireless station 212 and the required CIR for this can be obtained based on the link parameter information included in the ACK packet a221. The interference power of the interference signal from the wireless station 213 received by the wireless station 212 can be obtained based on the interference information q included in the ACK packet a221. Based on these obtained value, the CIR margin can be obtained. However, needless to say, in the case where the interference strength information q202 is information indicating the CIR margin, it is unnecessary to perform such a calculation because it is possible to obtain the CIR margin by only performing extraction.

If there is any interference reduction mode with which the CIR margin calculated in the above-described manner is equal to or more than a prescribed value, the wireless station 211 judges that the link from the wireless station 211 to the wireless station 212 can be concurrently established with the link from the wireless station 213 to the wireless station 214 without being interfered with. Accordingly, the wireless station 211 transmits a control packet c212, which includes interference reduction mode information designate information that designates an interference reduction mode, to the wireless station 212.

In the above-describe manner, through the sequence shown in FIG. 10, the wireless station 211 judges that the link from the wireless station 211 to the wireless station 212 and the link from the wireless station 213 to the wireless station 214 can be concurrently established, and records this as the concurrent transmission link information.

Figure 12:
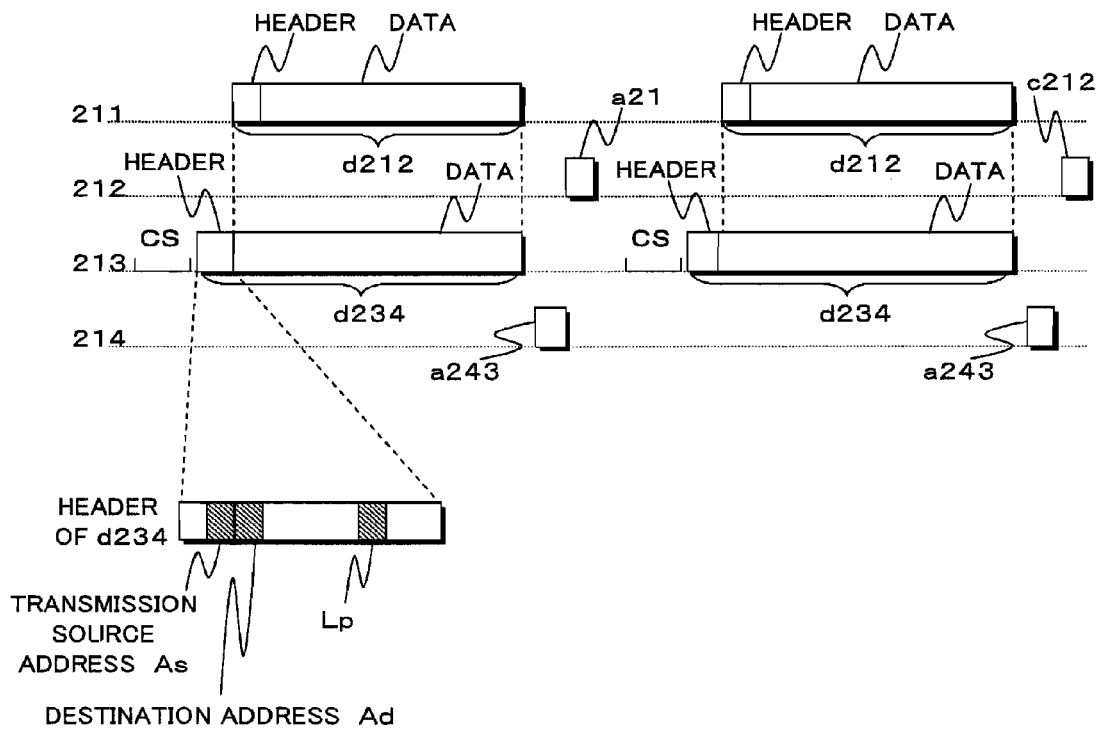
FIG. 12 is a transmission sequence diagram showing concurrent transmission, pertaining to the second embodiment of the present invention.

As illustrated in FIG. 12, the wireless station 213 firstly transmits the data packet d234 to the wireless station 214 based on a CSMA technique. The header of the data packet d234 includes a transmission source address As, a destination address Ad and packet length information Lp. The wireless station 211 intercepts the header of the data packet d234, and analyzes and compares the wireless station identifier information with the concurrent link information recorded therein to judge that the link from the wireless station 213 to the wireless station 214 can be concurrently established with the link from the wireless station 211 to the wireless station 212. In this regard, the wireless station 211 also extracts the packet length information included in the header.

Upon completion of the extraction of the above-mentioned information from the header, the wireless station 211 transmits the data packet d212 to the wireless station 212 such that the data packet d212 overlaps with the data packet d234 in terms of time. In this regard, the wireless station 211 controls the data length of the data packet d212 based on the extracted packet information Lp such that the transmission of the data packet d212 completes at the same time as the completion of the transmission of the data packet d234. By adjusting the transmission times of the links for the concurrent transmission to be the same, it is possible to increase the period in which the concurrent transmission is performed, and more effectively improve the transmission capacity. It is possible to realize such concurrent transmission via a plurality of links by repeating the procedures described above. Note that address information is generally used as the wireless station identifier information.

Also note that information showing that concurrent transmission is performed is included into the data packet d212 being transmitted through concurrent transmission. Based on this information, the wireless station 212 transmits the ACK packet a221 after waiting for a time that requires for the completion of the normal ACK transmission, instead of transmitting the ACK packet a221 immediately after the data packet d212 is received. As a result, it is possible to avoid collision of the ACK packet a221 with the ACK packet a243.

The wireless station 11 also can intercept the ACK packet 243 and update the link parameter information such as the received-signal strength R41.

The wireless station 212 receives the header of the data packet d234 immediately before the concurrent transmission is started, and updates the received-signal strength R34.

The easiest way to update the link parameter information held by each wireless station is to have the wireless station to hold only the newest information. However, the newest information is not reliable in some cases, due to measurement error, temporal noises, temporal change of transmission paths, and so on. Therefore, in some cases, it is preferable to have the wireless station hold and use average of plural parameters recently used. For the calculation of the average, several average methods are available. For example, the following are available: a method of taking the average of prescribed times, a method for taking the average in a prescribed period, a method of multiplying the average at the last minutes by a forgetting factor that is less than 1, adding the newest value to the multiplication result, and normalizing the addition result.

In the above-described explanations, the link parameter information and the interference information is transmitted with being included in the ACK packet. However, such information may be included in another control packet or data packet used in the communication sequence. Also, since the link parameter information should be notified to an unspecified number of wireless stations, it is possible to notify the link parameter information with use of dedicated broadcast or multicast notification packets, instead of transmitting the link parameter information by including it in the ACK packet or the like addressed to a specific wireless station. If this is the case, there is an advantage that it is possible to notify the link parameter information at anytime regardless of the transmission timing of data packets and ACK packets. On the other hand, the method of notifying the link information by including it in the header of the ACK packet or the data packet addressed to a specific wireless station, there is an advantage that overhead that consumes transmission capacity can be reduced because a dedicated notification packet is not required. To take the both advantages, it is preferable to usually transmit the link parameter information by including it in the ACK packet or the like, and transmit the link parameter information with use of the notification packets only when the ACK packet or the like has not been transmitted for a long time. As a matter of course, it is possible to include the link parameter information to any packet other than the ACK packet.

Next, the structure of the wireless station pertaining to the second embodiment of the present invention is explained.

Figure 13:
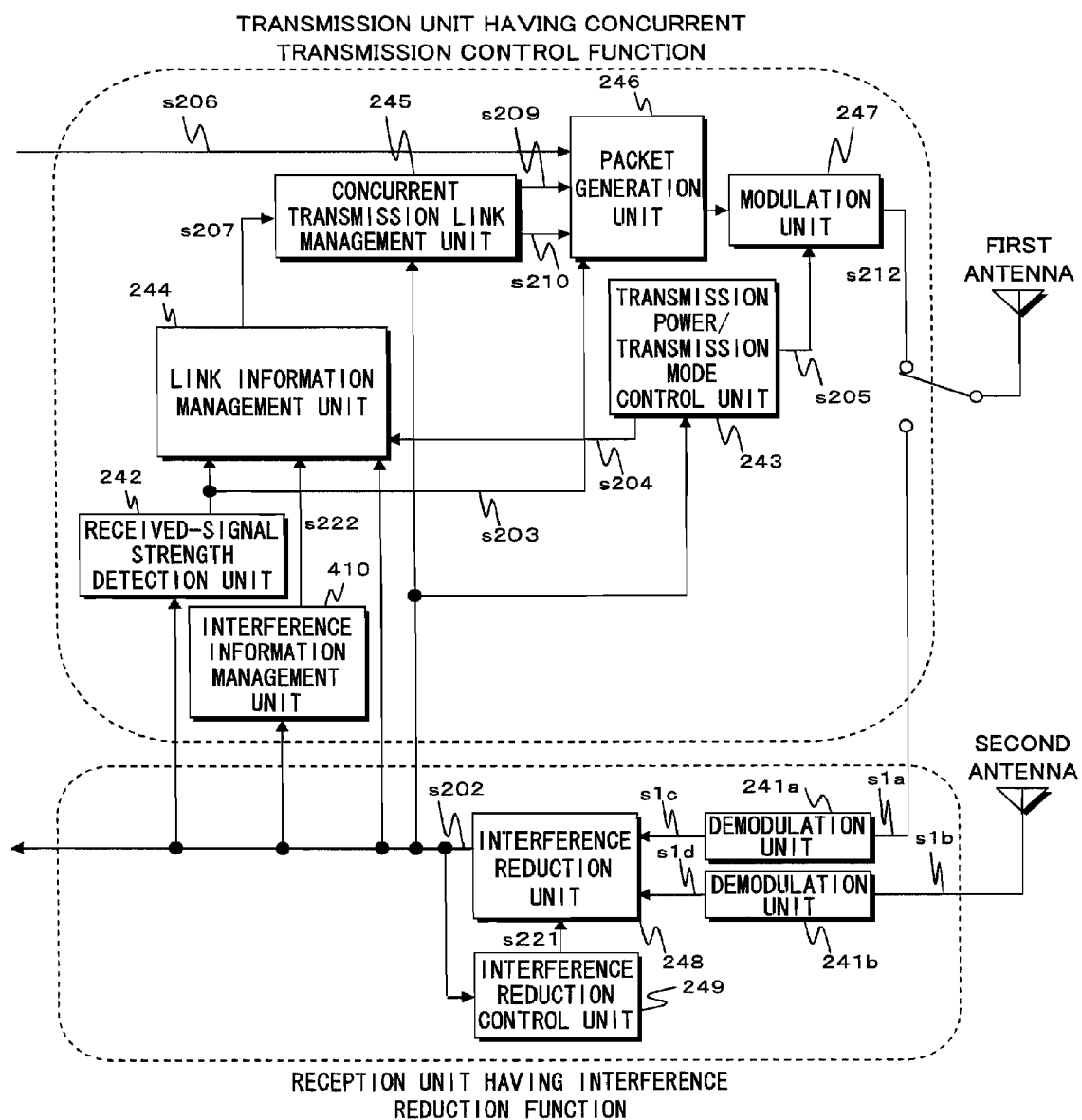
FIG. 13 shows a structure of a wireless communication apparatus pertaining to the second embodiment of the present invention.

FIG. 13 is an example structure of a wireless communication apparatus of the wireless station pertaining to the second embodiment of the present invention. In FIG. 13, the reference letter s1a represents an input signal from a first antenna, s1b represents an input signal from a second antenna, s1c represents first demodulated signal, s1d represents second demodulated signal, s202 represents decoded data, s203 represents a received-signal strength information of a received packet, s204 represents a transmission power information of the wireless station, s205 represents a transmission power/transmission mode control signal, s206 represents a transmission data, s207 represents concurrent transmission link judgment information, s209 represents a concurrent transmission timing signal, s210 represents concurrent transmission packet length information, s212 represents a transmission signal, and s221 represents a interference reduction control signal.

The first antenna is used for both transmission and reception, and the second antenna is used only for reception.

Demodulation units 241a and 241b respectively demodulate input signals from the first antenna and the second antenna, to respectively output a first demodulation signal and a second demodulation signal as complex baseband signals.

An interference reduction processing unit 248 adjusts amplitudes and phases of the input signals from the antennas and synthesizes the signals to reduce the interference signal level, and decodes the synthesized signal to output decoded data. The decoded data includes the header information and the control information of the packet being transmitted.

An interference reduction control unit 249 extracts the interference reduction mode designation information from the decoded data s202, and designates the interference reduction processing unit 248 to use the operation mode based on the interference reduction mode designation information. Also, to collect interference information for each mode, the interference reduction control unit 249 performs control for switching among the interference reduction modes while receiving the interference signal. The setting of the operation mode includes, specifically, setting of the interference reduction function to be effective/ineffective, designation of a type of the interference reduction method, and setting of the interference station to be subject to the interference reduction.

A received-signal strength detection unit 242 measures the received-signal strength of the packet being received, and outputs the received-signal strength information s203.

An interference information management unit 410 extracts the interference information q from the decoded data s202, updates the interference information having stored therein, and outputs the newest interference information s222 to a link information management unit 244. The link information management unit 244 extracts the link parameter information such as the received-signal strength information from the decoded data s202, and stores the link parameter information therein. The link information management unit 244 also stores therein the interference information s222 transmitted from the interference information management unit 410. Furthermore, using the received-signal strength s203 that has been measured and the transmission power information s204 of the wireless station, the link information management unit 244 estimates the received-signal strength of the link which can not be extracted from the decoded data s202. Based on these pieces of information, the link information management unit 244 judges which interference station to select as a concurrent transmission candidate station, and outputs concurrent transmission link judgment information s207.

A concurrent transmission link management unit 245 extracts the wireless station identifier information from the packet header of the decoded data s202, and judges whether a link is concurrently established, based on the concurrent transmission link management information s207 and the interference information transmitted from the interference information management unit 410. Then, the concurrent transmission link management unit 245 stores therein the link that has been judged affirmatively the interference reduction mode information corresponding thereto, as the concurrent transmission link information. Furthermore, the concurrent transmission link management unit 245 judges whether the link of the signal currently being received is available for the concurrent transmission by comparing the wireless station identifier information extracted from the packet header of the decoded data s202 with pieces of the concurrent transmission link information recorded in the past. If judging that the link is available for the concurrent transmission, the concurrent transmission link management unit 445 outputs the concurrent transmission timing signal s209 used for performing the concurrent transmission. Furthermore, the concurrent transmission link management unit 445 extracts the packet length information from the packet header of the decoded data s202. Based on the packet length information, the concurrent transmission link management unit 445 determines the packet length of the packet to be subject to the concurrent transmission (concurrent transmission packet) such that the transmission of the concurrent transmission packet completes at the same time as the end of the transmission of the packet currently being transmitted, and outputs the length as the packet length information s210.

The packet generation unit 246 receives the transmission data s206, generates a packet data, and transmits the packet data to a modulation unit 247. When complying with the CSMA procedures, the transmission unit 46 performs the carrier sense based on the received-signal strength s203 to judge whether to perform the transmission. However, in the case of having received the concurrent transmission timing signal s209 from the concurrent transmission link management unit 245, the transmission unit 246 judges to immediately perform the concurrent transmission regardless of the result of the carrier sense, and generates a packet based on the concurrent transmission timing signal s209 and the packet length information s210, and transmits the generated packet.

The modulation unit 247 coverts the received packet data to a modulation signal, and generates and transmits the transmission signal s212.

A transmission power/transmission mode control unit 243 determines the transmission power, the transmission mode and the code rate of the signal to be transmitted by the wireless station, and controls the transmission unit by giving thereto the transmission power/transmission mode information s205. At the same time, the transmission power/transmission mode control unit 243 gives the transmission power information s204 of the wireless station to the link information management unit 244.

Note that although two antennas are illustrated in FIG. 13, and only the first antenna is used for transmission, it is possible to use three or more antennas. Also, it is possible to use a plurality of antennas for transmission with assigning weights.

Figure 14:
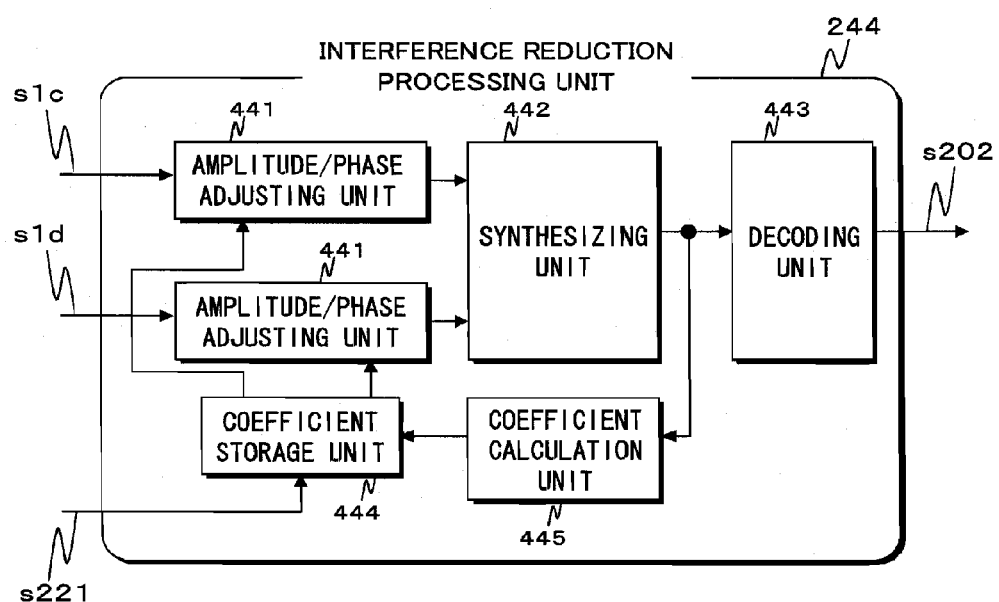
FIG. 14 shows an interference reduction processing unit pertaining to the second embodiment of the present invention.

FIG. 14 shows an example structure of the interference reduction processing unit 248 of FIG. 13. In FIG. 14, an amplitude/phase adjusting units 441 respectively multiply the demodulated signals s1c and s1d by the complex coefficient stored in a coefficient storage unit 444. A synthesizing unit 442 synthesizes the results of the multiplication. The decoding unit 443 decodes the output from the synthesizing unit 442 to obtain the decoded data s202. A coefficient calculation unit 445 performs calculation for reducing the interference signal of the output from the synthesizing unit 442, and updates the coefficient stored in the coefficient storage unit 444.

The coefficient calculation can be performed in the same manner as the method used for adaptive array processing, for example. Specifically, it is preferable to use a method of determining the coefficient that maximizes the ratio of the desired signal to the interference signal. However, other methods, such as the null-steering that minimizes the interference signal level, the beam-steering that maximizes the desired signal level, simple antenna-switching, and combinations or intermediates of these methods, may be used. Also, it is possible to use the plural methods. The simplest way is to use only a particular control method and make a judgment as to whether the control method is effective or ineffective, as an operation of the interference reduction mode. However, it is also possible to allow switching among the plurality of methods and provide a structure that can use the plurality of the interference reduction modes. If this is the case, although the processing is slightly complicated, the flexibility realizes appropriate mode selection even if there are other interference sources in addition to the subject interference station.

Note that although the interference reduction processing unit 244 is described above as a unit that follows the demodulation units 241a and 241b and processes the baseband signals, the interference reduction processing unit 244 may be followed by the demodulation units 241a and 241b and structured to adjust amplitudes and phases of the high-frequency signals and the intermediate-frequency signals to synthesize them.

Also, although FIG. 14 illustrates only one amplitude/phase adjusting unit 441 for each antenna, in the case of handling multi-carrier signals such as the OFDM signals, it is possible to perform more precise synthesizing processing by multiplexing each sub-carrier by the coefficient.

Figure 15:
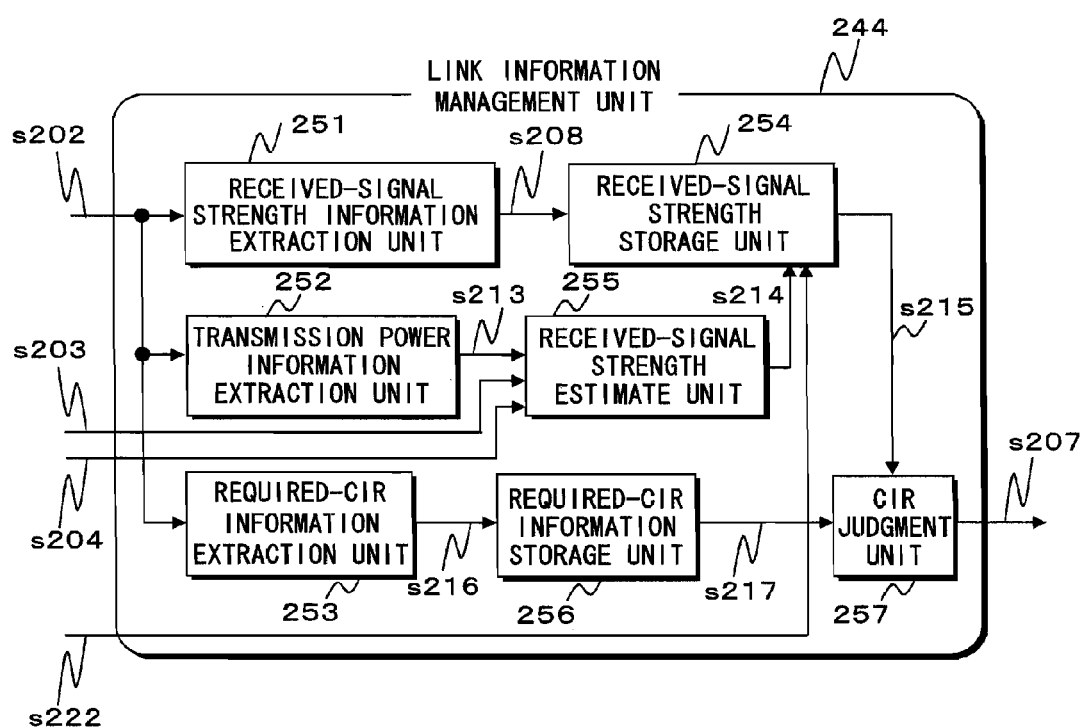
FIG. 15 shows a structure of a link information management unit pertaining to the second embodiment of the present invention.

FIG. 15 shows an example structure of the link information management unit 244 of FIG. 13. In FIG. 15, the reference letter 251 represents a received-signal strength extraction unit, 252 represents a transmission power information extraction unit, 253 represents a required-CIR information extraction unit, 254 represents a received-signal strength storage unit, 255 represents a received-signal strength estimate unit, 256 represents a required-CIR information storage unit, 257 represents a CIR judgment unit, s208 represents received-signal strength information that has been extracted, s213 represents transmission power information of decoded data, s214 represents a received-signal strength estimate value, s215 represents a CIR estimate value, s216 represents required-CIR information of decoded data, and s217 represents required-CIR information of a concurrent transmission candidate link. Explanations of other reference letters that are same as those in FIG. 13 are omitted here.

The received-signal strength information extraction unit 251, the transmission power information extraction unit 252 and the required-CIR information extraction unit 253 respectively extract the received-signal strength information s208, the transmission power information s213, and the CIR information s216 from the decoded data s202. The received-signal strength estimate unit 255 estimates the received-signal strength of the signal transmitted by the wireless station and received by the transmission source of the signal received by the wireless station, based on the received-signal strength s203 that has been measured, the transmission power information s204 of the wireless station itself, and the transmission power information s213 of the transmission source wireless station of the received signal, and outputs the received-signal strength estimate value s214.

The received-signal strength storage unit 254 stores therein the extracted received-signal strength information s208, the estimated received-signal strength s214 and the interference information s222. Based on these values, the received-signal strength storage unit 254 estimates the CIR measured at other wireless stations when concurrent transmission is performed, and outputs the CIR estimate value s215.

The required-CIR information storage unit 256 stores therein the required-CIR information s216 that has been extracted.

The CIR judgment unit 257 judges whether the links are available for the concurrent transmission, based on the CIR estimate value s215 and the required-CIR information s216, and outputs the judgment result as the concurrent transmission link judgment information s207.

Figures 16, 17:
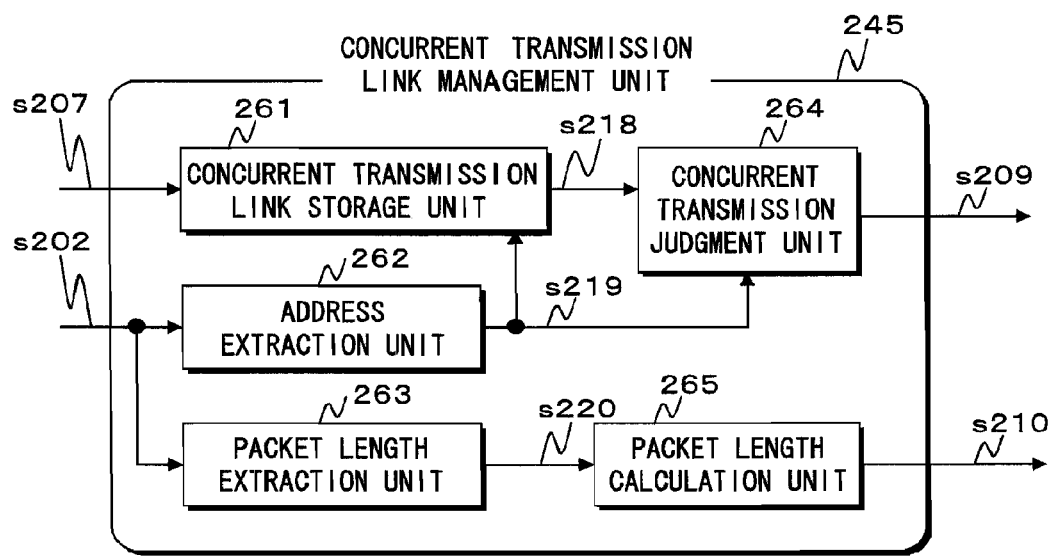
FIG. 16 shows a structure of a concurrent transmission link management unit pertaining to the second embodiment of the present invention.
FIG. 17 shows received-signal strength information to be stored in the wireless communication apparatus pertaining to the second embodiment of the present invention.

FIG. 16 shows an example structure of the concurrent transmission link management unit 245 of FIG. 13. In FIG. 16, the reference letter 261 represents a concurrent transmission link storage unit, 262 represents an address extraction unit, 263 represents a packet length extraction unit, 264 represents a concurrent transmission judgment unit, 265 represents a packet length calculation unit, s218 represents concurrent transmission link information that has been stored, s219 represents wireless station identifier information (address information), and s220 represents packet length information that has been extracted from decoded data.

The address extraction unit 262 extracts the wireless station identifier information s219 from the decoded data s202.

The concurrent transmission link storage unit 261 stores therein the address of the signal currently being received as information of a link that is available for the concurrent transmission, based on the concurrent transmission link judgment information s207.

The concurrent transmission judgment unit 264 compares the wireless station identifier information s219 with the concurrent transmission link information s18 that has already been stored, and judges whether the link of the signal currently being received is available for the concurrent transmission. If judging affirmatively, the concurrent transmission judgment unit 264 outputs the concurrent transmission timing signal s209.

The packet length extraction unit 263 extracts the packet length information from the decoded data s202.

The packet length calculation unit 265 calculates the concurrent transmission packet such that the packet length is decreased for the delay of the concurrent transmission start, based on the extracted packet length information, and outputs the packet length as the packet length information s210. In other words, the packet length is determined such that the transmission end times of the packet currently being received and the concurrent transmission packet to be transmitted are almost the same.

With the stated structure, the wireless station pertaining to the second embodiment can realize the concurrent transmission sequence for a plurality of links as explained above based on FIG. 10 and FIG. 12. Note that each of the units illustrated in FIG. 4 to FIG. 6 may be structured as hardware, or as a processor and software executed by the processor.

Note that although the structure of FIG. 13 is provided with both the concurrent transmission control function and the interference reduction function, it is unnecessary that all the wireless stations are provided with the both functions. For example, it is possible to realize the operation with a structure in which the wireless station 211 has only the concurrent transmission control function and the wireless station 212 has only the interference reduction function. Also note that each of the units illustrated in FIG. 13 to FIG. 16 may be structured as hardware, or as a processor and software executed by the processor.

FIG. 17 shows an example of pieces of the received-signal strength information stored in the received-signal strength storage unit 254 of FIG. 15. In the table of FIG. 17, R12 for example is the received-signal strength of a signal transmitted from the wireless station 211 to the wireless station 212, measured at the wireless station 212. These received-signal strengths include received-signal strengths extracted from the demodulated data of the received packet, received-strength estimate values estimated based on other information, and received-signal strength measured values measured by the wireless station. The received interference strength extracted from the interference information is to be stored in correspondence with the interference reduction mode information. In this example, a plurality of pieces of received interference strength information correspond to a plurality of modes. Specifically, in the case of the sequence explained above base on FIG. 10 to FIG. 12, R12, R32A and R32B are extracted from the packet of the wireless station 212, and R34 is extracted from the packet of the wireless station 214. R13 is a value estimated based on the received-signal strength estimate value of the packet of the wireless station 13, the transmission power information extracted from the packet of the wireless station 13 and the transmission power information of the wireless station 11. R21, R31 and R41 are received-power strengths of the signals respectively transmitted by the wireless stations 12, 13 and 14, measured by the wireless station 11. If the interception results of packets other than those illustrated in FIG. 10 to FIG. 11 are used, R42A, R42B and R43 can be extracted for example, and R14 can be estimated. In this way, while receiving and intercepting packets, by storing each piece of received-signal strength information and constantly updating the information when new information is obtained, it is possible to increase the reliability of the data shown in the table of FIG. 17.

The required-CIR information stored in the required-CIR information storage unit 256 of FIG. 15 is the same as that of the first embodiment as FIG. 8 shows for example. The required CIR is basically determined by the signal mode consisted of a combination of a modulation method, a code method, a code rate, and so on. If the signal mode of a signal transmitted by each wireless station does not change, the require CIR for the signal of each wireless station is constant regardless of the destination. If this is the case, only one piece of the required-CIR information is required to be stored for each wireless station as the transmission source, as FIG. 8A shows. However, if it is necessary to change the signal mode depending on the destination, or if it is desired to consider the difference among the reception performances of the wireless stations, it is necessary to store pieces of required-CIR information according to combinations of the wireless station as the transmitter and the wireless station as the receiver, as FIG. 8B shows. In the explanation using FIG. 2, the wireless station as the receiver relating to the link includes the required-CIR information of the wireless station into the ACK packet or the like and transmits the required CIR. However, it is possible that the wireless station as the transmitter relating to the link includes the required-CIR information into a packet and transmits the packet, and the wireless station that intercepts the packet extracts the required-CIR information.

Also, the required-CIR information may indicate the signal mode, instead of the required CIR value.

Third Embodiment

Figure 18:
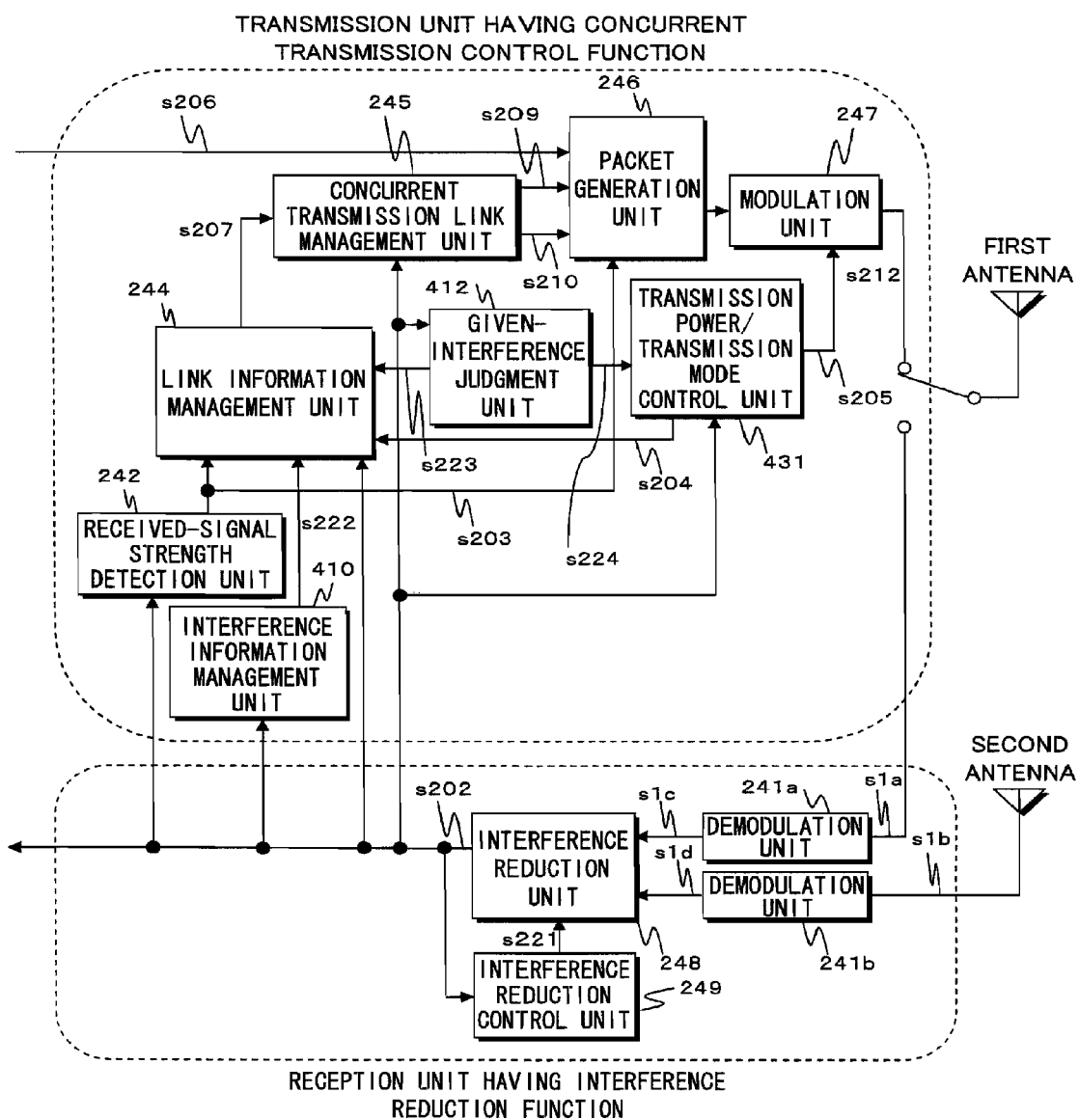
FIG. 18 shows a structure of a wireless communication apparatus pertaining to the third embodiment of the present invention.

FIG. 18 shows an example structure of a wireless communication apparatus pertaining to the third embodiment of the present invention. Most part of FIG. 18 is the same as the structure shown in FIG. 13. However, FIG. 18 is different from FIG. 14 in that a given-interference judgment unit 412 is added, and the transmission power/transmission mode control unit 431 has an additional function compared to the transmission power/transmission mode control unit 243 of FIG. 13. Other components and operations are the same as those of the second embodiment. Accordingly, the details thereof are not explained here.

The given-interference judgment unit 412 monitors the decoded data s202 to check whether the communication between the interference station and its communication party is normally performed, and notifies the transmission power/transmission mode control unit 431 of the results. In the sequence of FIG. 10, when the ACK packet a243 of the wireless station 214 is received, the given-interference judgment unit 412 monitors whether the ACK packet a243 will be received in the concurrent transmission sequence of FIG. 12, to estimate whether the given-interference exists or not. Specifically, in the sequence of FIG. 12, the wireless station 211 receives the header of the data packet d234 of the wireless station 213, and estimates the timing of the ACK packet a243 to be transmitted by the wireless station 214 to the wireless station 213, based on the information included in the header. Next, after transmitting the data packet d212 of the wireless station 211, the given-interference judgment unit 412 judges whether the ACK packet a243 of the wireless station 214 has been actually received with the estimated timing. Here, if the ACK packet a243 has not been received, the given-interference judgment unit 412 estimates that the data packet d212 transmitted by the wireless station 211 has interfered with the reception by the wireless station 214, and if the ACK packet a243 has been received, the given-interference judgment unit 412 estimates that no interference has occurred. The given-interference judgment unit 412 gives the result of the estimate as a given-interference estimate result s224 to the transmission power/transmission mode control unit 431. Also, based on the given-interference estimate result s224, the given-interference judgment unit 412 gives estimate information s223 as to the concurrent transmission can be established, to the link information management unit 244. The link information management unit 244 takes the information s223 in addition to the operations of the second embodiment, to judge whether the concurrent transmission can be established.

Figure 19:
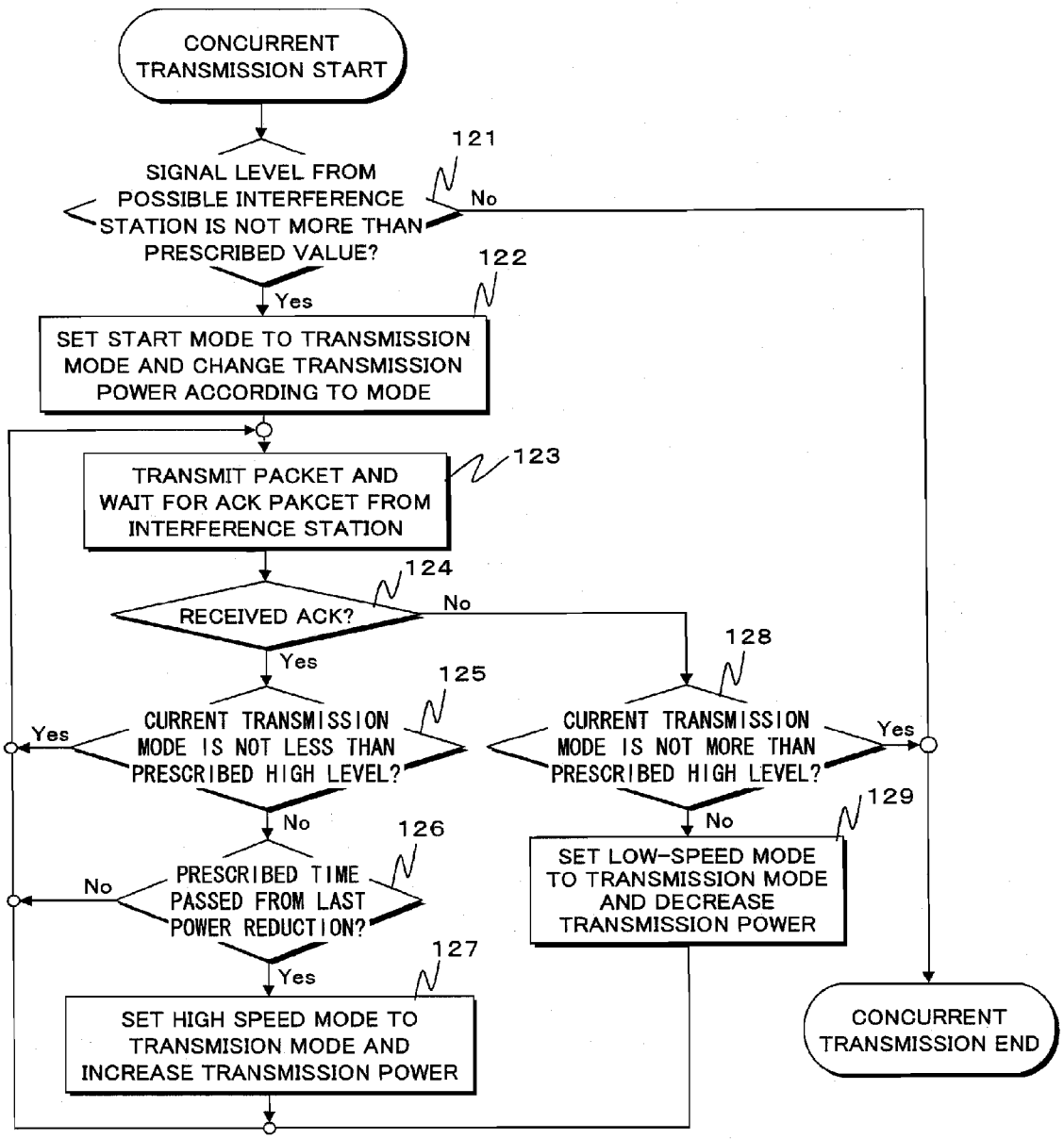
FIG. 19 is a flow chart showing a control algorithm for controlling a transmission power and a transmission mode pertaining to the third embodiment of the present invention.
Figure 20:
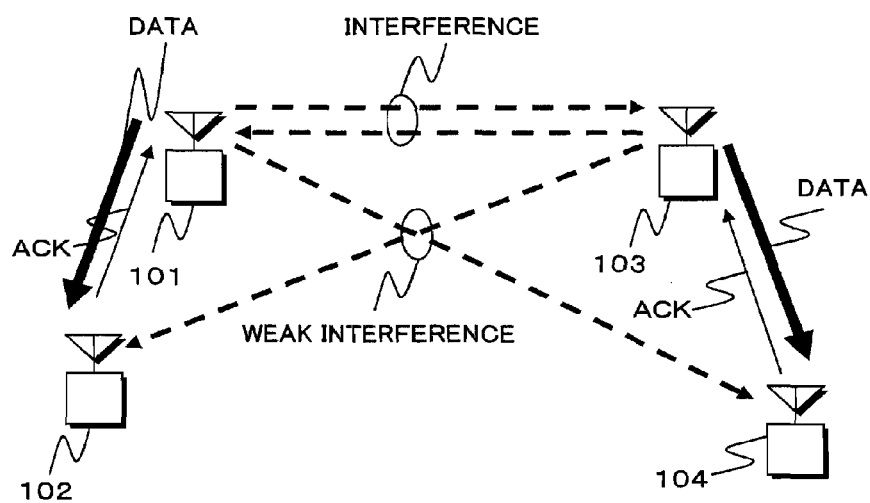
FIG. 20 is a conceptual diagram of a wireless communication system that uses a conventional CSMA technique.
Figure 21:
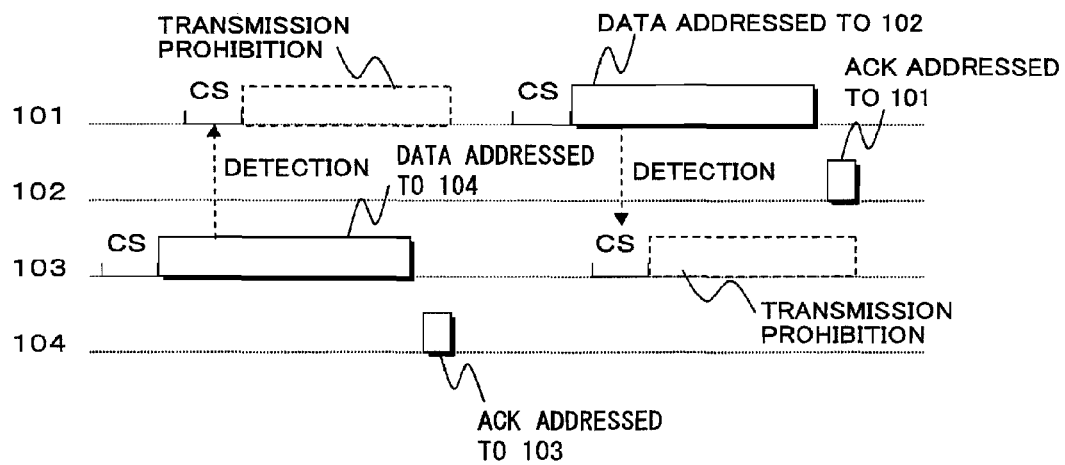
FIG. 21 is a transmission sequence diagram of a wireless communication system that uses a conventional CSMA technique.
Figure 22:
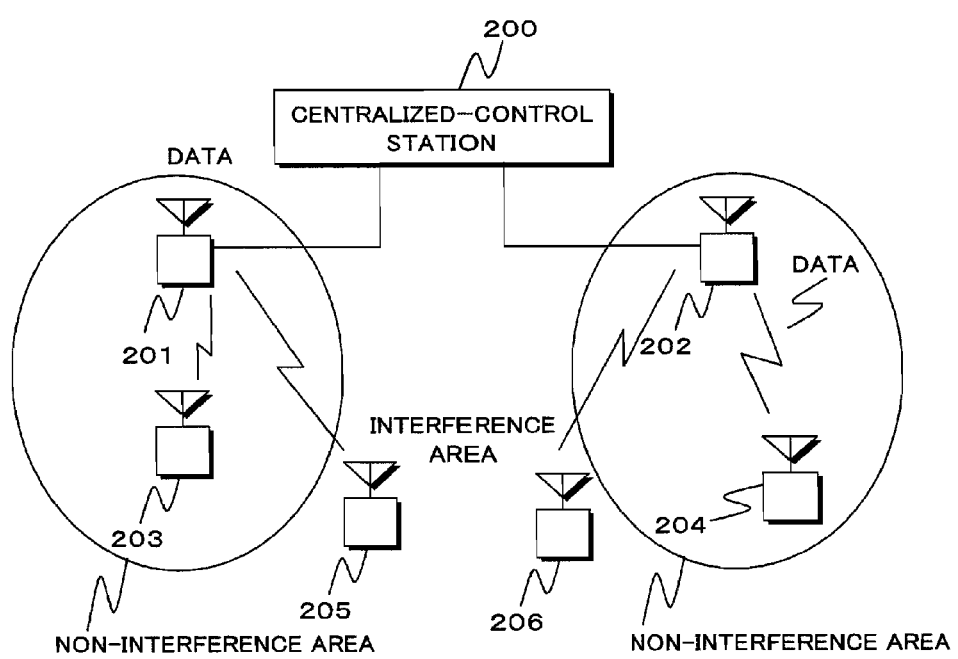
FIG. 22 is a conceptual diagram of a wireless communication system that performs concurrent transmission by dividing areas in a conventional manner.
Figure 23:
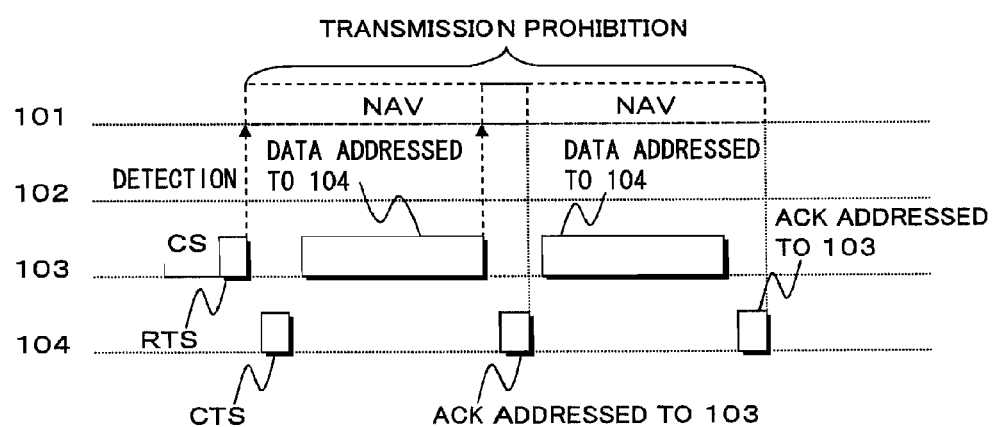
FIG. 23 is a transmission sequence diagram of a wireless communication system that uses a conventional CSMA/CA technique.
Figure 24:
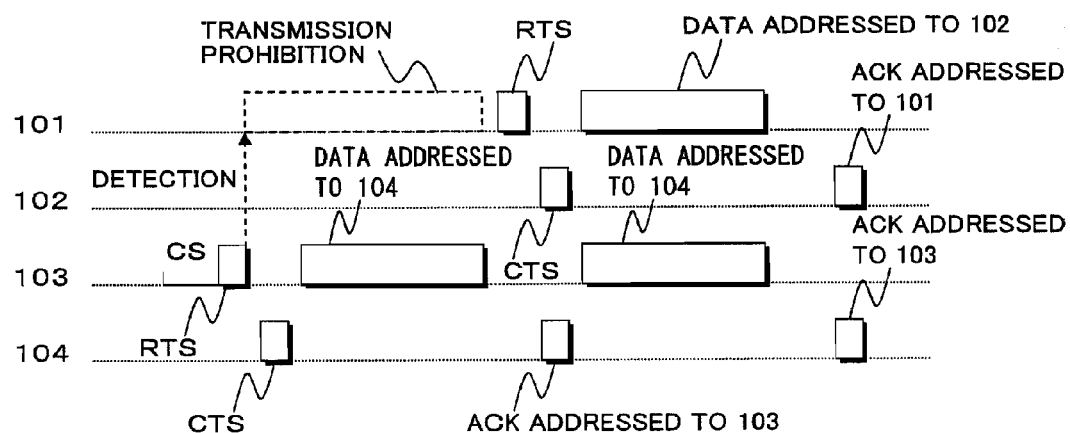
FIG. 24 is a transmission sequence diagram of a wireless communication system that performs conventional concurrent transmission.

FIG. 19 is a flowchart showing a control algorithm used by the transmission power/transmission mode control unit 431 to control the transmission power and the transmission mode. In FIG. 19, the concurrent transmission start is the time when the wireless station 211 transmits the first data packet in the sequence of FIG. 12. The following explains operations for controlling the transmission power and the transmission mode illustrated in FIG. 19, based on an example case where the wireless station 211 of FIG. 10 and FIG. 12 establishes concurrent transmission with a link from the wireless station 213 to the wireless station 214.

At the concurrent transmission start, if degree of the interference given by the wireless station 211 to the wireless station 214 has not been estimated, the transmission power/transmission mode control unit 431 firstly judges whether to perform the concurrent transmission based on the strength of a signal from the wireless station 214, such as the received-signal strength of the ACK packet a243 (121). If the received-signal strength is more than a prescribed value, it can be estimated that the signal transmitted by the wireless station 211 and having a high strength reaches the wireless station 214. Accordingly, the communication based on the conventional CSMA/CA method is performed instead of the concurrent transmission. If the received-signal strength is not more than the prescribed value, the transmission power/transmission mode control unit 431 sets the transmission mode to a prescribed start mode, and the transmission power is set to be the minimum power in a range the link to the wireless station 212 can be established, in order to suppress the interference to be given to the wireless station 214 (122). Here, the start mode is a transmission mode with the minimum required CIR in the range of general use, which is generally a low transmission-rate mode. Regarding the transmission power, the lowest transmission power for establishing the link is to be obtained based on the transmission power used in the sequence of FIG. 10 without the concurrent transmission, and the interference margin calculated from the link parameter information and the interference information at the time. In this case, it is preferable that the start transmission power is set to be the total of the obtained minimum transmission power and a margin that corresponds to the estimate errors and variations. As a result, it is possible to start the concurrent transmission with lowering the possibility of affecting other wireless stations by the given-interference even if the given interference has not been estimated.

Next, in the sequence of FIG. 12, the transmission power/transmission mode control unit 431 starts the concurrent transmission, and waits for the ACK packet a243 from the wireless station 214 (124). In the case of receiving the ACK packet a243, the transmission power/transmission mode control unit 431 judges that the signal transmitted by the wireless station 211 does not interfere with the reception by the wireless station 214. The transmission mode is classified into some levels based on the transmission rate. A particular mode having a sufficiently high transmission speed for a practical use has been prescribed as "a prescribed high level", and a particular mode having a low transmission speed has been prescribed as a prescribed low level". If the level of the current transmission mode is equal to or more than the prescribed high level, the transmission power/transmission mode control unit 431 does not change the transmission power and the transmission mode (125). If the level of the current transmission mode is less than the prescribed low level, the transmission power/transmission mode control unit 431 judges whether a prescribed period has been passed from the power reduction last time (126). If the prescribed period has not been passed, the transmission power/transmission mode control unit 431 does not change the transmission power and the transmission mode. If the prescribed period has been passed, the transmission power/transmission mode control unit 431 changes the mode to a high-speed mode at a prescribed step and increases the transmission power so as to establish a link in the mode (127). Due to this prescribed period, in the case where the reception by the wireless station 214 has been completed with a transmission power that tends to cause interference according to temporal changes of the transmission path, it is possible to avoid that the wireless station 211 further increases the transmission power and continuously interferes with other wireless stations. It is preferable to determine the prescribed period to be sufficiently larger than the time required for transmitting a standard type data packet.

At the step 124 for judging whether the ACK packet has been received, if judged that the ACK packet a243 has not been received, the transmission power/transmission mode control unit 431 judges that the signal transmitted by the wireless station 211 interferes with the reception by the wireless station 214, and attempts to eliminate the interference. Firstly, the transmission power/transmission mode control unit 431 judges whether the level of the current transmission mode is more than the prescribed low level (128), and if it is not more than the prescribed low level, the transmission power/transmission mode control unit 431 does not increase the transmission power and gives up performing the concurrent transmission. If this is the case, subsequent communications will be performed in accordance with the normal CSMA/CA method. If the level of the current mode is more than the prescribed low level, the transmission power/transmission control unit 431 changes the transmission mode to a low-speed mode at a prescribed step, and reduces the transmission power within a range the link can be established in the mode (129). Subsequently, the transmission power/transmission mode control unit 431 continuously performs the concurrent transmission, and repeats the step (123) for waiting for the ACK and later steps.

When changing the transmission power at the steps 127 and 129, it is possible to judge whether the link can be established by calculating the interference margin based on the link parameter information and the interference information. In this calculation, it is preferable to have margin for errors of the link parameter information and the interference information and the variations in terms of time of the transmission path. If representing the scale of the increase and the decrease of the transmission power level in logarithmic representation such as decibel, it is possible to secure an appropriate margin with the minimum number of interferences with the link from the wireless station 213 to the wireless station 214, by increasing the level in small steps and decreasing the level in large steps.

According to the second embodiment, it is possible to estimate whether the wireless station 211 will interfere with the wireless station 214 without using the link parameter information included in the signal from the wireless station 214. Accordingly, in FIG. 10, even if the link parameter information is not included in the ACK packet a243 of the wireless station 214, it is possible to estimate whether the concurrent transmission can be established. In other words, even if the wireless station 213 and the wireless station 214 illustrated in FIG. 9 do not have the function of the present invention, it is possible to realize the concurrent transmission in a situation where the conventional art can not realize it. This further increase chances of realizing the concurrent transmission.

In the explanations of the embodiments above, the CIR is used for evaluating the states of the links and the interferences. However, Carrier to Interference and Noise Ratio (CINR) may be used instead of the CIR. In the case where the signal power and the interference power are small, noises other than the interferences are unignorable. In such a case, it is possible to more precisely judge the communication availability by using the CINR.

In the embodiments above, it is preferable that the wireless station 11 or 211 further has a function to control the transmission directionality. By controlling the directionality to increase benefits to the transmission target station and decrease benefits to stations that might cause interference, it is possible to further increase chances of realizing the concurrent transmission. A typical example of the transmission directionality is, specifically, that based on the technique of the adaptive array antenna. For example, this control is realized by the wireless station 11 by receiving a signal transmitted by the wireless station 13 or the wireless station 11, thereby calculating a synthesizing coefficient for a desired adaptive array.

The structures of all the embodiments of the present invention may be realized as LSIs. These circuits may be realized as separate chips. Alternatively, some or all of circuits may be integrated onto a single chip.

Note that though LSI is used here, the circuit may be variously described as IC, system LSI, super LSI or ultra LSI depending on the level of integration.

Note also that the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, and the like is considered to be a possibility.

INDUSTRIAL APPLICABILITY

The wireless control apparatus and the wireless communication method pertaining to the present invention can achieve high system-transmission capacity by performing concurrent transmission via a plurality of links, without using a central control station. Therefore, the present invention is useful in a wireless system in which many wireless stations exist within a limited space. Also, the wireless control apparatus and the wireless communication method pertaining to the present invention are useful in the case of a wireless system that has a difficulty in providing a central management station, such as the case of performing wireless communications among audio/video apparatuses and information apparatuses in a home or an office, and in the case of continuously transmitting a large amount of data of video information or the like which often causes lack of capacity when transmitted via a plurality of links by time division.

The invention claimed is:

1. A wireless communication method for transmitting data from a first wireless station having a concurrent transmission control function and a second wireless station having an interference reduction function to control an interference reduction mode selected from among a plurality of interference reduction modes, wherein
   the interference reduction function is a function to reduce a level of an interference signal by adjusting amplitudes and phases of input signals from a plurality of antennas, and synthesizing the input signals,
   each of the plurality of interference reduction modes uses a different adjustment method to adjust the amplitudes and the phases of the input signals, and
   the first wireless station judges, based on a carrier-to-interference ratio (CIR) of the second wireless station in at least one of the plurality of interference reduction modes, whether concurrent transmission between a signal from the first wireless station to the second wireless station and a signal of an interference station is available, and if judging that any particular interference reduction mode enables the concurrent transmission, transmits an interference reduction mode control signal to the second wireless station to instruct the second wireless station to operate in the particular interference reduction mode and transmits the signal to the second wireless station according to a timing that overlaps transmission of the signal that is being transmitted by the interference station.

2. A wireless communication method for transmitting data from a first wireless station having a concurrent transmission control function and a second wireless station having an interference reduction function to control an interference reduction mode, wherein
   the first wireless station judges, based on a carrier-to-interference ratio (CIR) of the second wireless station in at least one type of an interference reduction mode, whether concurrent transmission between a signal from the first wireless station to the second wireless station and a signal of an interference station is available, and if judging that any particular interference reduction mode enables the concurrent transmission, transmits an interference reduction mode control signal to the second wireless station to instruct the second wireless station to operate in the particular interference reduction mode and transmits the signal to the second wireless station according to a timing that overlaps transmission of the signal that is being transmitted by the interference station, the first wireless station transmits interference station information, indicating a third wireless station as a detected interference station, to the second wireless station, the second wireless station transmits, to the first wireless station, link parameter information that includes a signal strength of the signal of the first wireless station, and interference information that includes an interference reduction mode of the interference station and an interference strength corresponding thereto, and the first wireless station judges whether the concurrent transmission with the interference station is available based on the link parameter information and the interference information.

3. The wireless communication method of claim 2, wherein a fourth wireless station transmits, to the first wireless station, received-signal strength information of a signal transmitted by the third wireless station to the fourth wireless station, transmission power information of the fourth wireless station, and required-CIR information showing a CIR required for the fourth wireless station to receive the signal transmitted by the third wireless station, and the first wireless station estimates a CIR of the forth wireless station based on the link parameter information, and compares the CIR with the required-CIR information to judge whether the transmission link from the third wireless station to the fourth wireless station and the transmission link from the first wireless station to the second wireless station are compatible in concurrent transmission without interference with each other.

4. The wireless communication method of claim 3, wherein the first wireless station estimates the CIR of the fourth wireless station based on the received-signal strength information of the fourth wireless station obtained by measuring a received-signal strength of a signal transmitted by the fourth wireless station to the third wireless station, the received-signal strength information of the signal transmitted by the third wireless station to the forth wireless station and the transmission power information of the fourth wireless station which are included in the link parameter information, and transmission power information of the first wireless station.

5. The wireless communication method of claim 3, wherein the fourth wireless station transmits link parameter information that includes received-signal strength information of the signal from the third wireless station and link parameter information that includes received-signal strength information of the signal from the first wireless station, and the first wireless station estimates the CIR of the fourth wireless station based on the link parameter information of the fourth wireless station.

6. The wireless communication method of claim 3, wherein after transmitting the signal to the second wireless station according to a timing that overlaps transmission of the signal that is being transmitted by the third wireless station to the fourth wireless station, the first wireless station waits for a receipt acknowledgement signal that the fourth wireless station transmits to the third wireless station, and in a case the receipt acknowledgment signal has not been received at an expected timing, cancels the concurrent transmission at a next transmission if a current transmission power is not more than a prescribed low level, and attempts the concurrent transmission with a transmission power decreased by a prescribed decrease amount next time if the current transmission power is more than the prescribed low level.

7. The wireless communication method of claim 6, wherein for transmitting the signal to the second wireless station according to a timing that overlaps transmission of the signal that is being transmitted by the third wireless station to the fourth wireless station, the first wireless station uses a prescribed transmission power as a default transmission power.

8. The wireless communication method of claim 6, wherein after transmitting the signal to the second wireless station according to a timing that overlaps transmission of the signal that is being transmitted by the third wireless station to the fourth wireless station, the first wireless station waits for the receipt acknowledgement signal that the fourth wireless station transmits to the third wireless station, and in a case the receipt acknowledgment signal has been received with the expected timing, attempts the concurrent transmission with a transmission power increased by a prescribed increase amount next time if a prescribed period has been passed since the transmission power was decreased last time and the current transmission power is more than the prescribed low level.

9. The wireless communication method of claim 8, wherein if changes in an amount of power is represented in decibel, the prescribed decrease amount is greater than the prescribed increase amount.

10. A wireless communication method used by a wireless station to include interference information of at least one interference station into a wireless packet and transmit the packet to another wireless station, wherein the interference information includes an interference station identifier indicating the interference station, interference strength information of the interference station when the wireless station operates in each of a plurality of interference reduction modes, and interference reduction mode information indicating one of the plurality of interference reduction modes used in interference reduction processing, the interference reduction processing is processing of reducing a level of an interference signal by adjusting amplitudes and phases of input signals from a plurality of antennas, and synthesizing the input signals, each of the plurality of interference reduction modes uses a different adjustment method to adjust the amplitudes and the phases of the input signals, and the interference strength information includes information corresponding to at least one out of a received-interference power of an interference signal to be transmitted by the interference station, a carrier-to-interference ratio represented as a ratio between a received-signal power and the received-interference power, and a margin of the carrier-to-interference ration with respect to a ratio of a required signal power to the received-interference power.

11. A wireless communication apparatus that transmits data to a wireless station having an interference reduction function to control an interference reduction mode, comprising:

a link information management unit operable to judge, based on the carrier-to-interference ratio in at least one of a plurality of interference reduction modes, whether concurrent transmission between a signal from the wireless communication apparatus to the wireless station and a signal of an interference station is available; and a concurrent transmission link management unit operable to store therein a result of the judgment by the link information management unit, and generates an interference reduction mode control signal for instructing the wireless station to operate in a particular interference reduction mode that enables the concurrent transmission, wherein the interference reduction function is a function to reduce a level of an interference signal by adjusting amplitudes and phases of input signals from a plurality of antennas, and synthesizing the input signals, each of the plurality of interference reduction modes uses a different adjustment method to adjust the amplitudes and the phases of the input signals, and after transmitting the interference reduction mode control signal to the wireless station, the wireless communication apparatus transmits the signal to the wireless station according to a timing that overlaps transmission of the signal that is being transmitted by the interference station.

12. A wireless communication apparatus comprising:

an interference reduction processing unit operable to control an interference reduction mode selected from among a plurality of interference reduction modes; and an interference reduction control unit operable to receive an interference reduction mode control signal and determine and control the interference reduction mode showing an operation status of the interference reduction processing unit, based on the received interference reduction mode, wherein the interference reduction function is a function to reduce a level of an interference signal by adjusting amplitudes and phases of input signals from a plurality of antennas, and synthesizing the input signals, each of the plurality of interference reduction modes uses a different adjustment method to adjust the amplitudes and the phases of the input signals, and the wireless communication apparatus generates interference information that includes an identifier of an interference station that is different from an transmission target, information indicating a type of the interference reduction mode, and received-signal strength of the interference information in the interference reduction mode, and transmits the interference signal to the transmission target.

* * * * *